(12) United States Patent
Chow et al.

(10) Patent No.: US 10,667,154 B2
(45) Date of Patent: May 26, 2020

(54) SYSTEM AND METHOD FOR EVALUATING WIRELESS DEVICE AND WIRELESS NETWORK PERFORMANCE

(71) Applicant: Tutela Technologies Ltd., Victoria (CA)

(72) Inventors: Brennen Stephen Chow, Port Coquitlam (CA); Hunter Banford Bulmer Macdonald, Keswick Ridge (CA); David Daniel Yarish, Victoria (CA); Anthony Sean Kroeker, Victoria (CA); Stephen William Neville, Victoria (CA); Thomas E. Darcie, Victoria (CA)

(73) Assignee: Tutela Technologies Ltd., Victoria (CA)

( * ) Notice: Subject to any disclaimer, the term of this patent is extended or adjusted under 35 U.S.C. 154(b) by 0 days.

(21) Appl. No.: 15/872,209

(22) Filed: Jan. 16, 2018

(65) Prior Publication Data

US 2018/0206135 A1    Jul. 19, 2018

Related U.S. Application Data

(60) Provisional application No. 62/447,239, filed on Jan. 17, 2017.

(51) Int. Cl.
*H04W 24/08* (2009.01)
*H04L 12/26* (2006.01)
*H04L 12/24* (2006.01)

(52) U.S. Cl.
CPC ......... *H04W 24/08* (2013.01); *H04L 41/5009* (2013.01); *H04L 43/0876* (2013.01);
(Continued)

(58) Field of Classification Search
CPC ...................................................... H04L 43/50
See application file for complete search history.

(56) References Cited

U.S. PATENT DOCUMENTS 8,345,599 B2 *  1/2013  Famolari ............... H04W 48/17
                                                   370/328
8,355,945 B1     1/2013  Lall et al.
                         (Continued)

FOREIGN PATENT DOCUMENTS

CA          2420238 C      5/2011
CA          2800482 A1    12/2011
                (Continued)

OTHER PUBLICATIONS

Li, S.; International Search Report from corresponding PCT Application No. PCT/CA2018/050042; search completed Apr. 16, 2018.

*Primary Examiner* — Ayanah S George
(74) *Attorney, Agent, or Firm* — CPST Intellectual Property Inc.; Brent J. Slaney

(57) ABSTRACT

There is provided a method of evaluating wireless device and/or wireless network performance and/or wireless network usage trends. The method comprises providing wireless device software to each of a plurality of wireless electronic devices connected to one or more of a plurality of networks by having the wireless device software embedded in the corresponding electronic device, wherein the wireless device software is embedded in or operable with a plurality of types of applications and performs at least one test associated with characteristics and/or location of the device, and/or performance of the device and/or the network, and/or usage of the device by a user; receiving via one or more collection servers, test data obtained by the wireless device software of each of the plurality of wireless electronic
(Continued)

devices; aggregating the received data; and storing and outputting the aggregated data.

42 Claims, 17 Drawing Sheets

(52) U.S. Cl.
CPC ............ *H04L 43/50* (2013.01); *H04L 43/045* (2013.01); *H04L 43/08* (2013.01)

(56) References Cited

U.S. PATENT DOCUMENTS

| | | | |
|---|---|---|---|
| 8,572,290 B1* | 10/2013 | Mukhopadhyay | H04L 43/50 709/251 |
| 8,862,950 B1* | 10/2014 | Ginsberg | G06F 11/3688 714/25 |
| 9,038,151 B1* | 5/2015 | Chua | H04L 45/02 709/223 |
| 9,430,364 B1 | 8/2016 | Ryan et al. | |
| 9,444,692 B2 | 9/2016 | Lehane et al. | |
| 9,451,451 B2 | 9/2016 | Chow et al. | |
| 9,465,668 B1* | 10/2016 | Roskind | G06F 9/5072 |
| 9,530,168 B2 | 12/2016 | Ahn et al. | |
| 2005/0049991 A1* | 3/2005 | Aggarwal | G06F 16/283 |
| 2005/0125408 A1* | 6/2005 | Somaroo | G06Q 10/10 |
| 2006/0224730 A1 | 10/2006 | Fok et al. | |
| 2008/0239972 A1 | 10/2008 | Omar | |
| 2008/0274716 A1* | 11/2008 | Fok | H04W 12/08 455/410 |
| 2010/0279764 A1* | 11/2010 | Allen | G07F 17/32 463/25 |
| 2012/0135729 A1* | 5/2012 | Chiou | H04W 24/10 455/434 |
| 2012/0215438 A1* | 8/2012 | Liu | G01S 19/09 701/409 |
| 2013/0073473 A1* | 3/2013 | Heath | G06Q 30/02 705/319 |
| 2013/0159081 A1* | 6/2013 | Shastry | G06Q 30/0274 705/14.23 |
| 2014/0336960 A1* | 11/2014 | Haghighat-Kashani | G06Q 10/04 702/60 |
| 2015/0371163 A1 | 12/2015 | Noh et al. | |
| 2016/0100325 A1 | 4/2016 | Hain | |
| 2016/0255482 A1 | 9/2016 | Brown et al. | |
| 2017/0171770 A1 | 6/2017 | Wennesheimer et al. | |
| 2017/0214585 A1* | 7/2017 | Whiteneck | H04L 41/5038 |
| 2017/0220933 A1 | 8/2017 | Gonguet et al. | |
| 2018/0070866 A1* | 3/2018 | Raahemifar | A61B 5/1455 |

FOREIGN PATENT DOCUMENTS

| | | | |
|---|---|---|---|
| CA | 2662415 C | 9/2012 | |
| WO | 2006/099473 A2 | 9/2006 | |
| WO | 2006/105296 A1 | 10/2006 | |
| WO | WO-2008042813 A2 * | 4/2008 | ............ G06F 9/5011 |
| WO | 2010/019452 A2 | 2/2010 | |
| WO | 2011/139639 A1 | 11/2011 | |
| WO | 2014/165631 A1 | 10/2014 | |

* cited by examiner

SYSTEM AND METHOD FOR EVALUATING WIRELESS DEVICE AND WIRELESS NETWORK PERFORMANCE

CROSS-REFERENCE TO RELATED APPLICATION(S)

This application claims priority to U.S. Provisional Patent Application No. 62/447,239 filed on Jan. 17, 2017, the contents of which are incorporated herein by reference.

TECHNICAL FIELD

The following relates to systems and method for evaluating wireless device and wireless network performance, and wireless network usage trends.

DESCRIPTION OF THE RELATED ART

The number of wireless devices that are accessing wireless communication networks is continually growing. These devices may access the various networks via cellular, WiFi and other access points. As the number of devices grows, the strain on these networks grows, affecting the performance of both the networks and the devices.

In order to address the performance of wireless devices and wireless networks, network service providers, device manufacturers, application developers and other entities that have a stake in affecting such performance require performance and usage data. Various techniques exist for collecting and evaluating performance and usage data, for example, standalone on-device applications or modules that perform periodic testing. Wireless carriers may also have native applications that have access to certain performance data that can be evaluated. However, these techniques can be either intrusive to the devices and users of those devices, or be limited to the type of network and/or type of device and/or type of user onto which the applications or modules are deployed.

SUMMARY

The following provides a system and method that enables wireless device and wireless network performance to be evaluated by embedding wireless device software in a plurality of applications (or operating systems) deployed and running on a plurality of wireless electronic device types and across a plurality of network types, to enable an aggregation of a more comprehensive collection of data. This allows a larger and more meaningful data set to be created for subsequent analyses and reporting. The aggregated data set(s) can be used to provide raw data, reports, and dashboard-type interfaces to third parties, and/or prepare and send feedback data to the wireless device software to control testing behaviour and if desired to control the amount and type of data that is collected.

The feedback data can be used for many different operations, including to adapt and improve performance of the application and/or device, which takes into account data acquired and aggregated from a multitude of applications, devices, and networks. The raw data, reports, and dashboard interfaces can be used to provide network carriers or service providers, device manufacturers, game and/or application developers, and other interested parties to perform actions based on a more complete data set, for example, for device and network benchmarking, mobile advertising, application traction and popularity, investment decision making, quality of experience (QoS), network planning, etc.

In one aspect, there is provided a method of evaluating wireless device and/or wireless network performance and/or wireless network usage trends. The method comprises providing wireless device software to each of a plurality of wireless electronic devices connected to one or more of a plurality of networks by having the wireless device software embedded in the corresponding electronic device, wherein the wireless device software is embedded in or operable with a plurality of types of applications and performs at least one test associated with characteristics and/or location of the device, and/or performance of the device and/or the network, and/or usage of the device by a user; receiving via one or more collection servers, test data obtained by the wireless device software of each of the plurality of wireless electronic devices; aggregating the received data; and storing and outputting the aggregated data.

In other aspects there are systems and computer readable medium configured or operable to perform the method.

BRIEF DESCRIPTION OF THE DRAWINGS

Embodiments will now be described by way of example with reference to the appended drawings wherein.

DETAILED DESCRIPTION

The following provides a system and method that enables wireless device and wireless network performance and wireless network usage trends to be evaluated by embedding wireless device software in the background of a plurality of applications (or operating systems) deployed and running on a plurality of device types and across a plurality of network types; to enable an aggregation of data types for the analysis and reporting of a more meaningful dataset.

It has been found that by crowdsourcing data from a plurality of applications on a plurality of device types in a plurality of network types, a larger and more meaningful data set is obtained for not only performing analytics on devices, applications, and networks, but also for providing feedback to such applications, devices, and networks to modify and/or improve testing behaviour. Moreover, the aggregated data set(s) can be used to provide raw data, reports, and dashboard-type interfaces to third parties. In this way, data such as network quality of service (QoS), app and device data that is crowdsourced from mobile devices can be used to: determine and illustrate the customer's perspective of a network, show device and application usage data, deliver insights that are immediately actionable, and test various parts of device and network performance that is useful in various ongoing applications.

Figure 1:
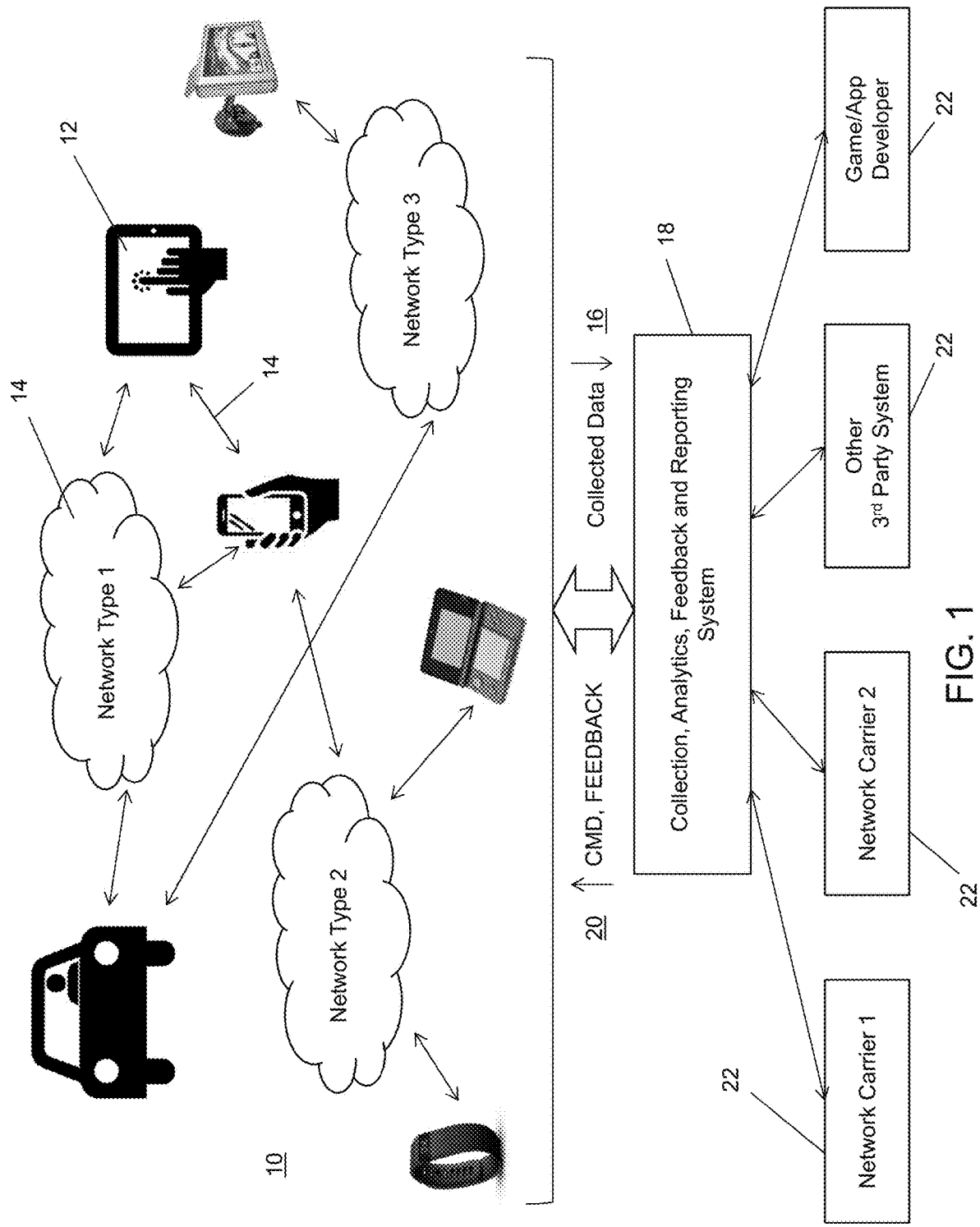
FIG. 1 is a schematic block diagram of a wireless communication environment that includes a number of network and device types.

Turning now to the figures, FIG. 1 illustrates an example of a wireless environment 10 which includes a number of wireless networks 14 that can be of different types, e.g., different cellular network types (2G, 3G, 4G, etc.). The different network types can also include other types of wireless networks such as WiFi networks accessible through available WiFi access points. Within the wireless network environment 10 various electronic communication devices 12 having wireless capabilities operate by connecting to one or more of the different networks/network types 14 and/or directly with each other over peer-to-peer or mesh-type networks 14. As illustrated in FIG. 1, various types of electronic devices 12 are configured to connect to and utilize one or more wireless network types 14, therefore providing a heterogeneous network environment 10 for which performance can be monitored, measured, analyzed, feedback provided, and operability adjusted as herein described.

In order to obtain a more meaningful data set and to provide data analytics on a more representative environment 10, each of the devices 12 includes a software functionality (described below) that is capable of performing tests, monitoring existing device operations and usage, and otherwise collecting data on or related to one or more applications on that device 12. By partnering with publishers of various mobile apps (e.g., games), the software functionality can be distributed to millions of mobile devices 12 to anonymously collect QoS, device and app usage data, among other things. Various partnership arrangements can be implemented, such as 1) revenue sharing on raw data, and/or report sales—e.g. providing insights by way of analysis or convenient presentation of information for subsequent analyses; 2) payment of upfront fees to app/game developers, 3) providing app/game developers with useful reports to encourage adoption of software functionality, etc. It can be appreciated that partnerships would not necessarily be required in order to deploy the software functionality on devices by distribution through existing channels, apps, OS, etc.

It can be appreciated that such software functionality can also be integrated with carrier apps or other purpose-built apps to be used on a number of mobile devices 12. The software functionality can be embedded in apps and games running on various mobile platforms/OS such as Android, iOS, Windows, etc.; as well as other mobile platforms such as those used for wearables, gaming, vehicle systems, wireless sensors, etc. That is, any other device/platform with location-tracking capabilities (e.g., GPS, network based location, etc.) and network (e.g., Internet) connectivity with an ability to run the software functionality described herein are applicable to the data collection, analysis, and feedback/reporting mechanisms described herein. In some implementations, devices with only network connectivity and without location-based capabilities may also be incorporated into the system.

The data 16 that is collected is preferably tied to a location or otherwise considered "location-based" such that the data 16 or information derived from the data 16 can be placed on a map. The data 16 is also preferably collected in an anonymous manner such that no personally identifiable information is collected and/or stored by the system 18. For example, the system 18 should be configured to not collect a device's advertiser ID, device ID, or other information that could be used in conjunction with another dataset to identify the user of the device 12. In one implementation, the software functionality described herein can be configured to generate and append a unique random number which is specific to the particular installation, and which is reset (e.g. regenerated) periodically (e.g., each day). This can be done to ensure that an adversary cannot observe data reported from one device over the course of several days to determine who that device may belong to.

The data 16 can include, without limitation: device location, device manufacturer name, device model, OS name and version, network operator ID, % memory free, CPU utilization, battery drain rate, storage utilization (i.e. device metrics), application name, download bytes, upload bytes, first install time, last updated time (i.e. mobile application metrics), upload throughput, download throughput, latency, link speed, signal strength, jitter, packet discard rate, packet loss, # of radio frequency conflicts (i.e. network QoS metrics), BSSID, SSID, signal strength (i.e. Wi-Fi scan metrics), connection start/end times, connection type, technology, service provider, cell ID, LAC, MCC, MNC, DHCP response time (i.e. connection metrics), etc.

The collected data 16 is fed to a central system 18 that includes modules and processes for collecting the data 16, processing and analyzing the data 16, generating feedback for the devices 12, and preparing user interfaces and reports therefore. It can be appreciated that multiple "central" systems 18 can be used, e.g., to comply with handling laws requiring that data from a particular jurisdiction be stored in that jurisdiction, etc. The data can be securely stored in cloud-based databases and securely transmitted via secure connections (e.g., HTTPS). The databases can be globally dispersed and can be configured to provide direct access to the clients of the system 18.

The reports and user interfaces are generated and made available to one or more third parties 22. In FIG. 1 several examples of third party types are provided, including without limitation, network carriers (multiple different ones), game and/or application (app) developers, and other 3$^{rd}$ party systems such as data analytics firms, mobile advertising entities, investment and financial entities, etc. The reports and user interfaces can be provided using data visualization tools such as graphical reports, interactive dashboards, web tools, etc. Reports can be delivered on a periodic basis or in real time with dashboards being available when needed online at any time.

The raw data and/or reports, dashboards and other user interfaces can be used for innumerable applications and use cases. For example, the data 16 that is collected can be used for network planning, wherein since the system 18 observes potentially all networks 14, wireless service providers can interact with the system 18 to see how they are performing relative to competition in specific areas. This can indicate, for example, what the highest value areas are for improving a network, since the best new sites for network improvement are typically areas where there is a lot of network traffic and one in which a network provider is being outperformed by the competition. The data can also be useful to wireless service provider customers who may wish to see how their service provide is performing relative to alternatives.

Another use case is for roaming monitoring, since network carriers typically lack knowledge regarding the quality of experience their users get when they roam onto other networks. The system 18 configured as herein described can determine, for the devices 12 having the software functionality obtaining the crowdsourced data 16, whether or not data 16 is being collected from a roaming device 12, and if the device 12 is roaming the system 18 can be configured to determine who the home service provider is, from the data 16 that is collected. This tells the carrier if their roaming partners are performing well enough and who they should be choosing to be their roaming partner in the future.

Self-Organizing Networks (SONs) can also benefit from the data 16 that is crowdsourced by the system 18. SONs dynamically adjust the network, antennae, or wave forming characteristics in response to network quality. The idea is that the network is self-healing such that if there is an issue, the network will adjust to eliminate the issue all on its own. SONs typically require access to large amounts of field data to operate, which can be satisfied with the large datasets that can be obtained using the system 18.

Other use cases include, without limitation: device and network benchmarking in which the system reports on which networks, devices, cell towers, network equipment, operating systems, etc. perform best for consumers; and investment applications. Regarding informing investments, it can be appreciated that the system 18 can determine what various mobile applications exist and are being used on mobile devices 12, and be able to determine on a day-to-day basis how much those mobile applications are being used. This allows correlations to be made between user activity (e.g., mobile shopping, browsing, etc.) and a company's performance and thus share value. Yet another use case can include reporting on mobile application usage trends and which apps are gaining or losing popularity with customers. A wireless service provider could use this information to predict the network impact of consumer application trends. A financial institution could use this information to make predictions related to the stock market.

Figure 2A:
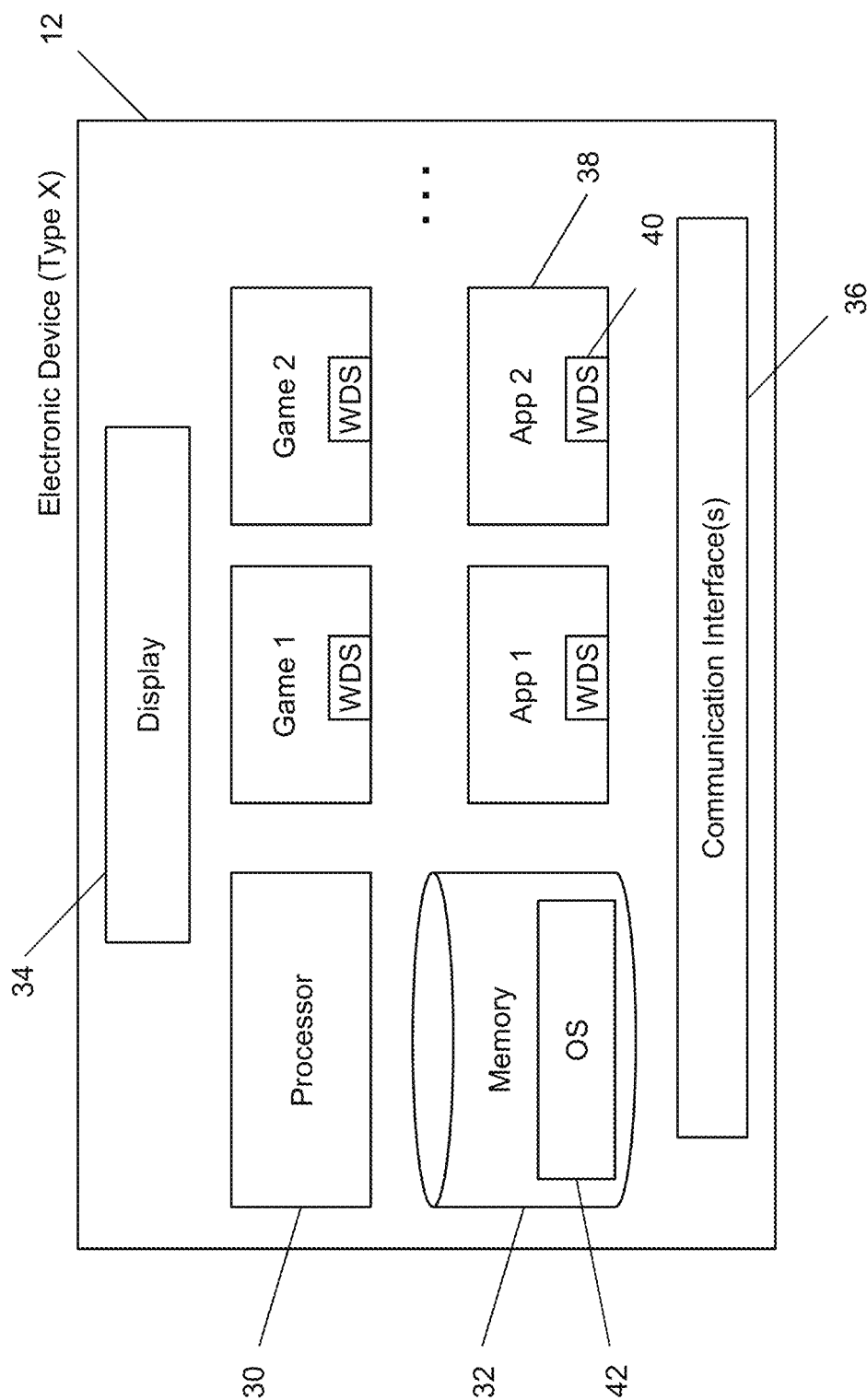
FIG. 2A is a block diagram of a configuration for a wireless device.

Turning now to FIG. 2A, an example of a configuration for an electronic device 12 is shown. The device 12 includes a processor 30, memory 32, and an operating system 42. The device 12 is also operable in this example to provide graphical user interfaces to a user via a display 34. For example, a visual component can be provided directly on the device 12 for displaying a portion of the information collected to the user, if desired by the user. The device 12 also includes one or more communication interfaces 36 that are operable to connect the device 12 to one or more networks 14. As also shown in FIG. 2A, the device 12 can include multiple apps 38, of different types as discussed above. In order to collect and send data 16 relevant across multiple apps 38 and app types, in this example configuration, each app 38 embeds the aforementioned software functionality, depicted as wireless device software (WDS) 40, that is embedded in, and runs in the background of the app 38 to gather particular data, perform tests, etc. The WDS 40 is capable of not only accessing components on the device 12 such as the processor 30, battery (not shown) and OS 42, the WDS 40 can be configured to either directly, or via the app 38 on which it resides, communicate on one or more networks 14 by interfacing with the one or more communication interfaces 36.

Figure 2B:
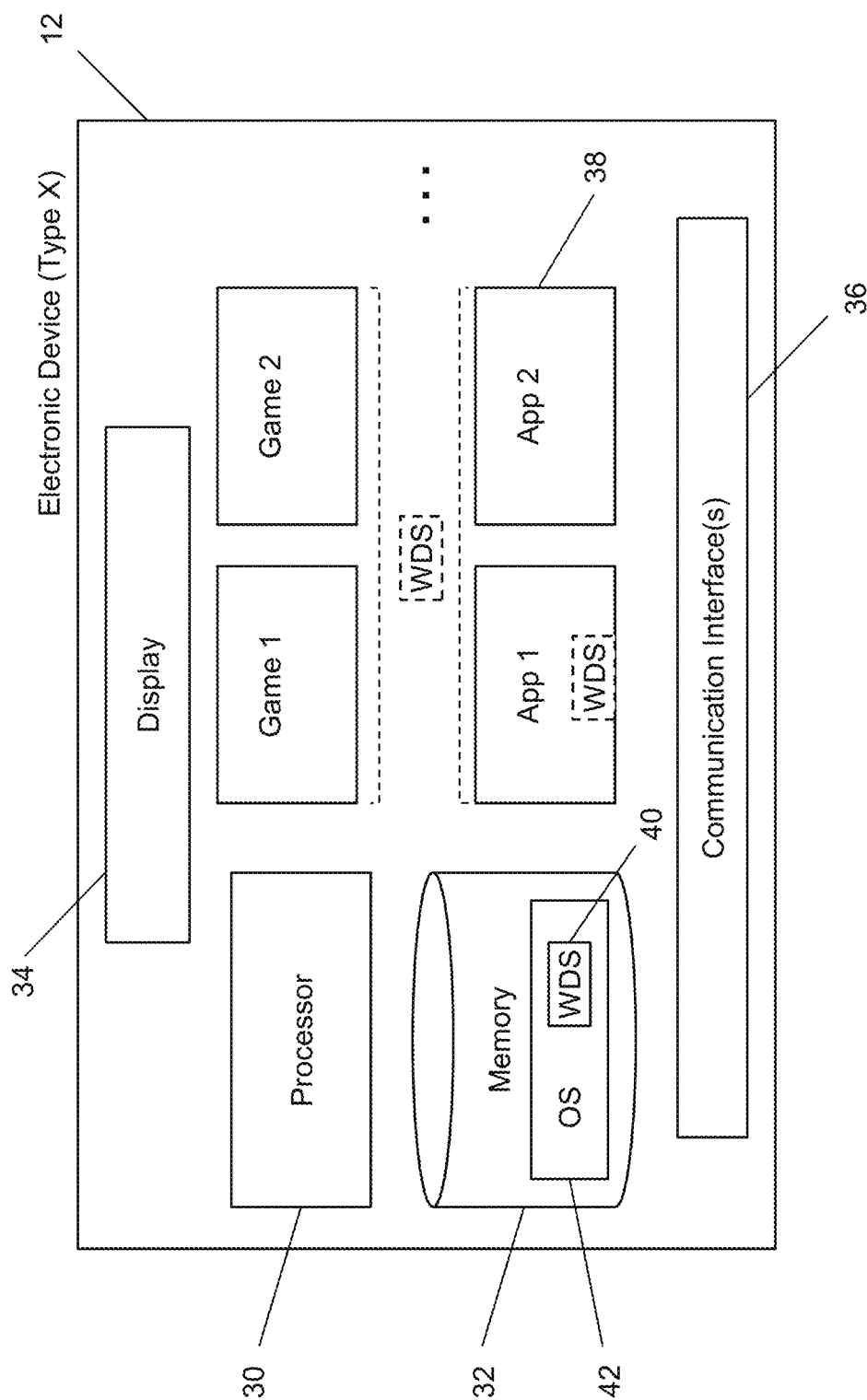
FIG. 2B is a block diagram of another configuration for a wireless device.

It can be appreciated that while in FIG. 2A each app 38 includes an embedded instance of the WDS 40 for monitoring and testing the app 38 and/or device 12, the WDS 40 can be deployed in various other configurations. For example, FIG. 2B illustrates that the WDS 40 can instead (or in addition to) reside in the OS 42 and centrally interact with a number of the apps 38. The WDS 40 may also reside as a stand-alone application or in another location or component of the device 12 as shown in dashed lines with functionality to interact with a number of (or all) of the apps 38. Similarly, one or more of the apps 38 can additionally have the WDS 40 reside thereon (also shown in dashed lines), e.g., apps 38 that need to have such operations controlled internally rather than being opened up to an external program, module or routine. The WDS 40 can therefore be installed in several different apps (i.e. in a weather app and then a totally different game) and these different apps could potentially be installed on the same phone or a multitude of different phones. This allows for the scenario wherein the WDS 40 is installed several times on the same phone (e.g., as illustrated), in which case the WDS 40 should identify that it is getting data from the same device 12. It can be appreciated that the WDS 40 can have a hardcoded limit of a number of tests that can be performed over a time period, which limits are unalterable by the configuration server. The WDS 40 can also be operable to identify its own code running in a different application on a same electronic device, and be responsive to identifying its own code running in the different application by having only one instance of the wireless device software operating at the same time.

Figure 3:
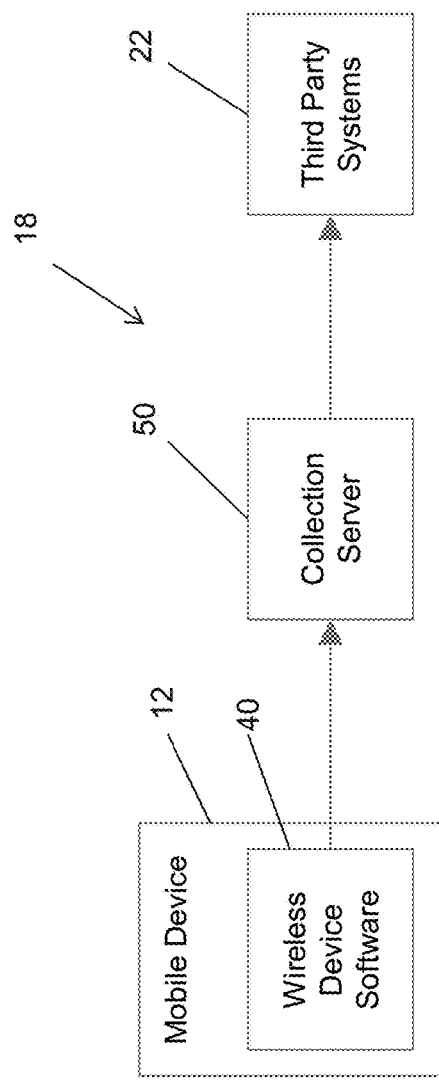
FIG. 3 is a block diagram of a configuration for collecting data from mobile devices using wireless device software (WDS)
Figure 4:
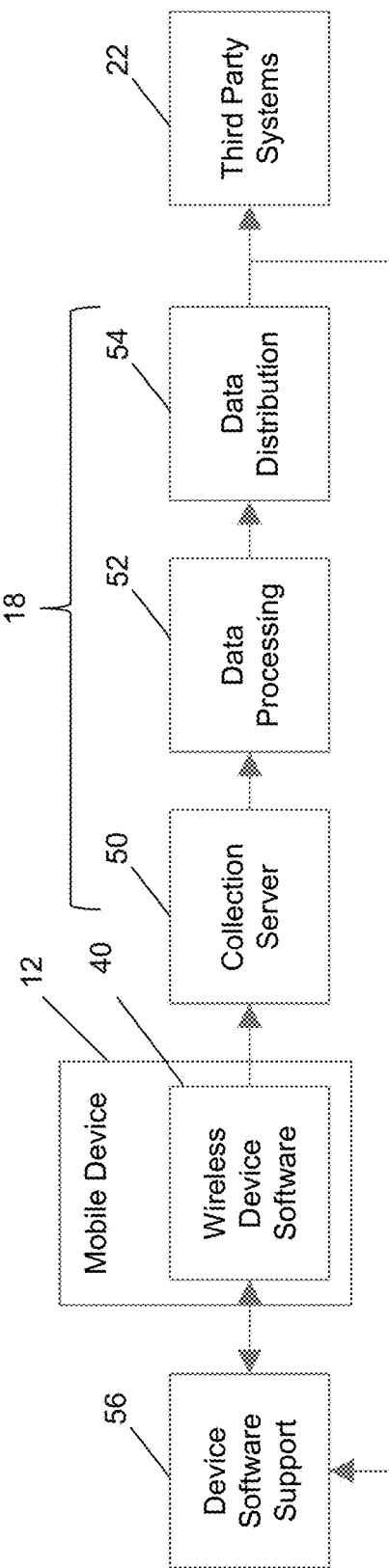
FIG. 4 is a block diagram of a configuration for collecting data from mobile devices using WDS with data processing, data distribution, and device software support.

A data collection configuration is shown at a high level in FIG. 3. Each mobile device 12 that is configured to operate the WDS 40 (using one or more apps 38) provides data to a collection server 50 that is deployed as part of the system 18. The collected data 16 is processed as herein described, along with data 16 obtained from other devices 12, to generate information and data for third party systems 22. FIG. 4 provides further detail for the configuration shown in FIG. 3, in which the collection server 50 collects the data 16 and has the collected data processed by a data processing stage 52. The data thus processed is then provided to a data distribution stage 54 for distribution to the third party systems 22. FIG. 4 also illustrates that the data distribution stage 54 can also enable the system 18 to provide feedback to the mobile device 12 by communicating with a device software support functionality 56 that is connectable to the WDS 40 to complete the feedback loop. By having the WDS 40 deployed in multiple different app types on multiple different device types operating with multiple different network types, not only can data be collected from a wider range of sources to provide a more meaningful and complete data set; a more comprehensive feedback network can be established thus providing the ability to reach a wider range of devices 12. Such a feedback network can be used for various purposes, including to modify the behaviour of the WDS 40.

Figure 5:
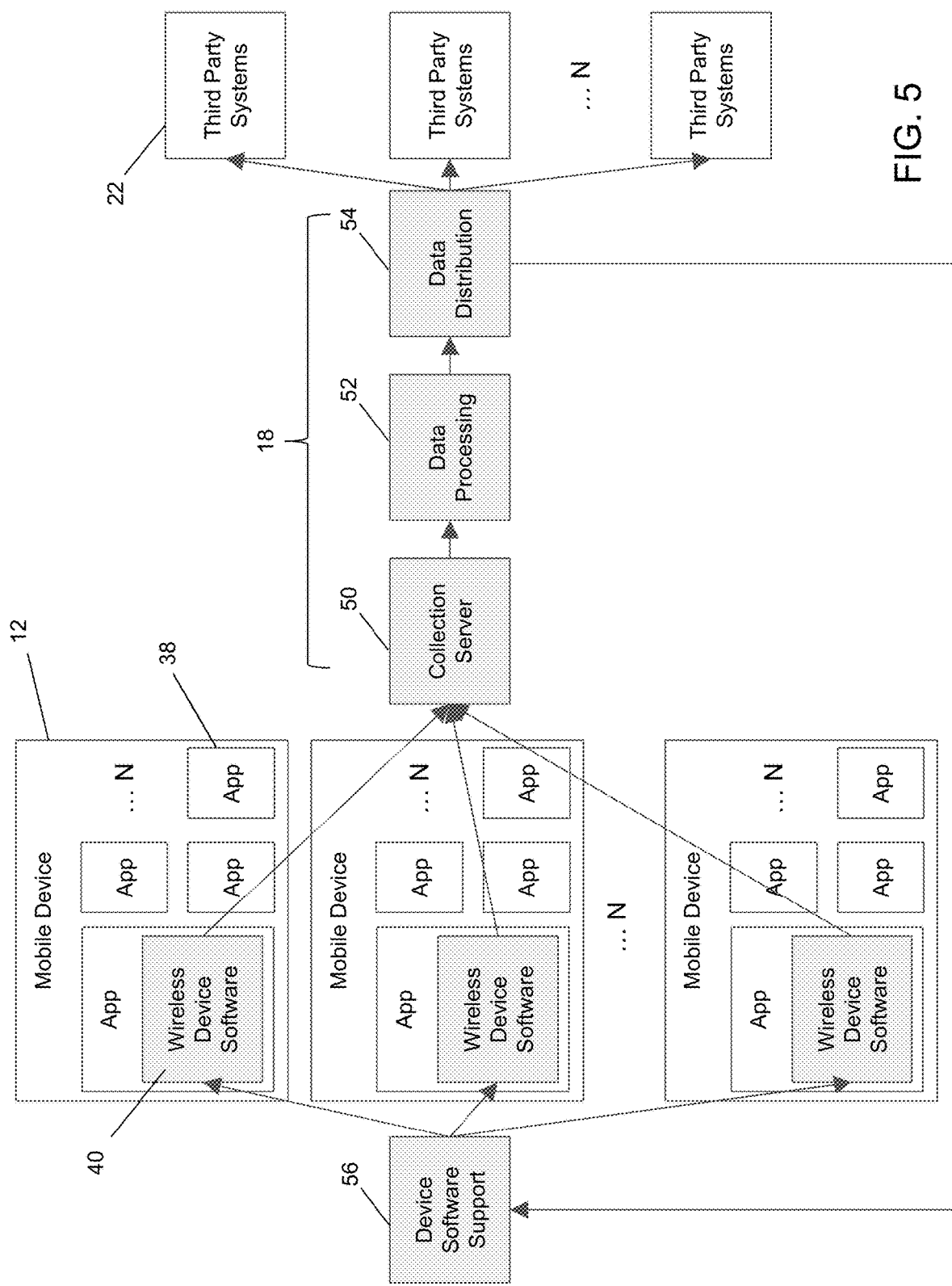
FIG. 5 is a block diagram illustrating the configuration shown in FIG. 4 for a plurality of devices and a plurality of third party systems.

FIG. 5 illustrates a configuration similar to that shown in FIG. 4, but illustrating the collection of data 16 from multiple devices 12 via multiple WDSs 40. As shown in FIG. 5, the plurality of mobile devices 12 shown can be served by a common device software support entity 56 and can provide data 16 to a common collection server 50. The system 18 may employ multiple regional collection servers 50 and device software support entities 56 as needed and thus the example shown in FIG. 5 is illustrative only.

Figure 6:
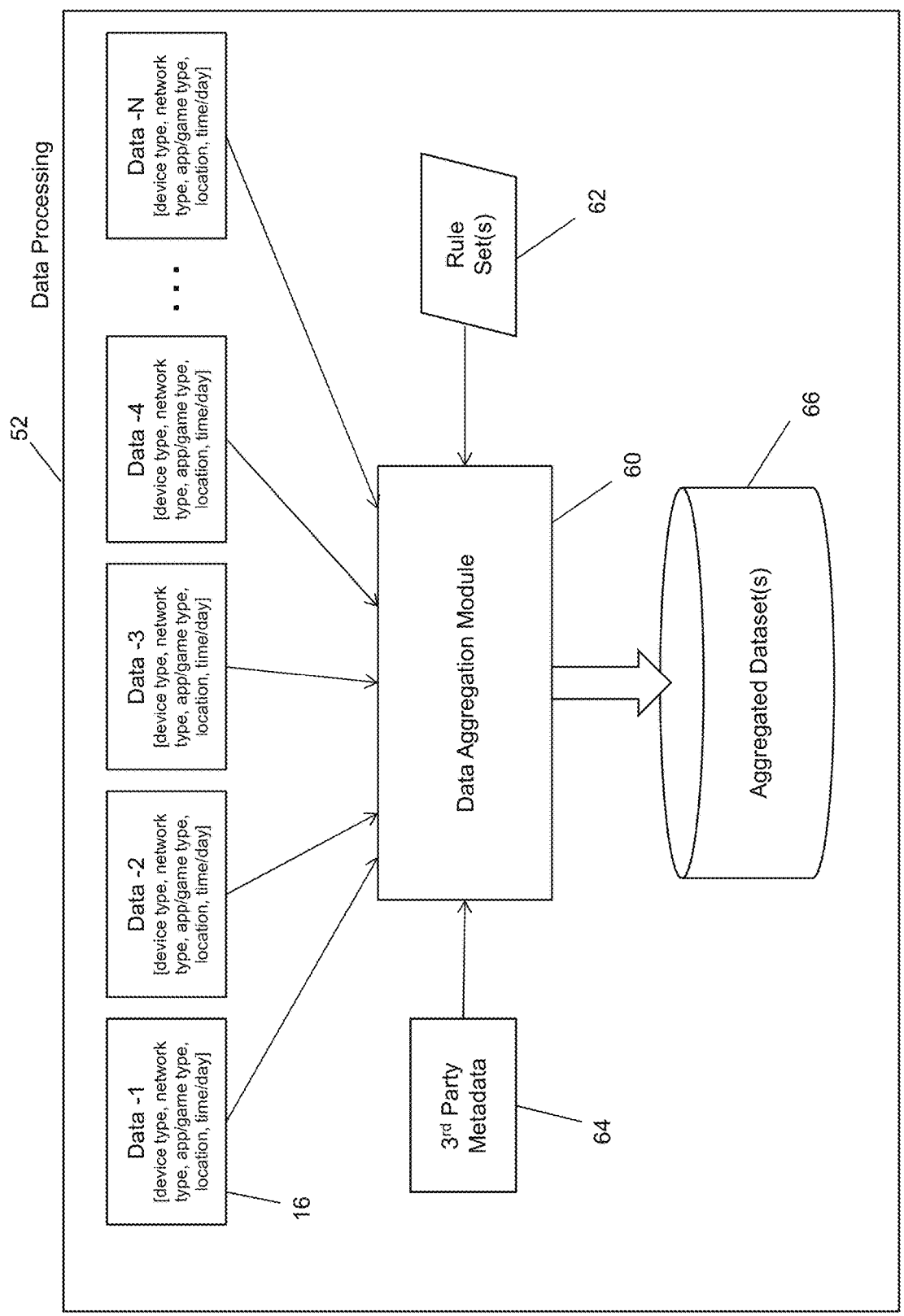
FIG. 6 is a schematic diagram illustrating a configuration for a data processing module to perform data aggregation from a plurality of devices.

On the data collection side, FIG. 6 illustrates operations that can be performed in the data processing stage 52 to collect and aggregate the data 16 that is received from potentially a multitude of different types of sources. As illustrated in FIG. 6 since the data 16 originates from different apps 38 on different device types operating across different network types, while the data may be collectively relevant, is not necessarily homogeneous. The collected data is therefore aggregated, in this example using a data aggregation module 60 that can utilize rule set(s) 62 or template(s) or other data structure(s) defining how to meaningfully aggregate the data for subsequent analysis by generating one or more aggregated dataset(s) 66 that can be stored within the data processing stage 52 or elsewhere within or accessible to the system 18. The data aggregation module 60 can also utilize any other 3$^{rd}$ party metadata 64 from third party data sources that are useful in aggregating and analyzing the data 16.

Figure 7:
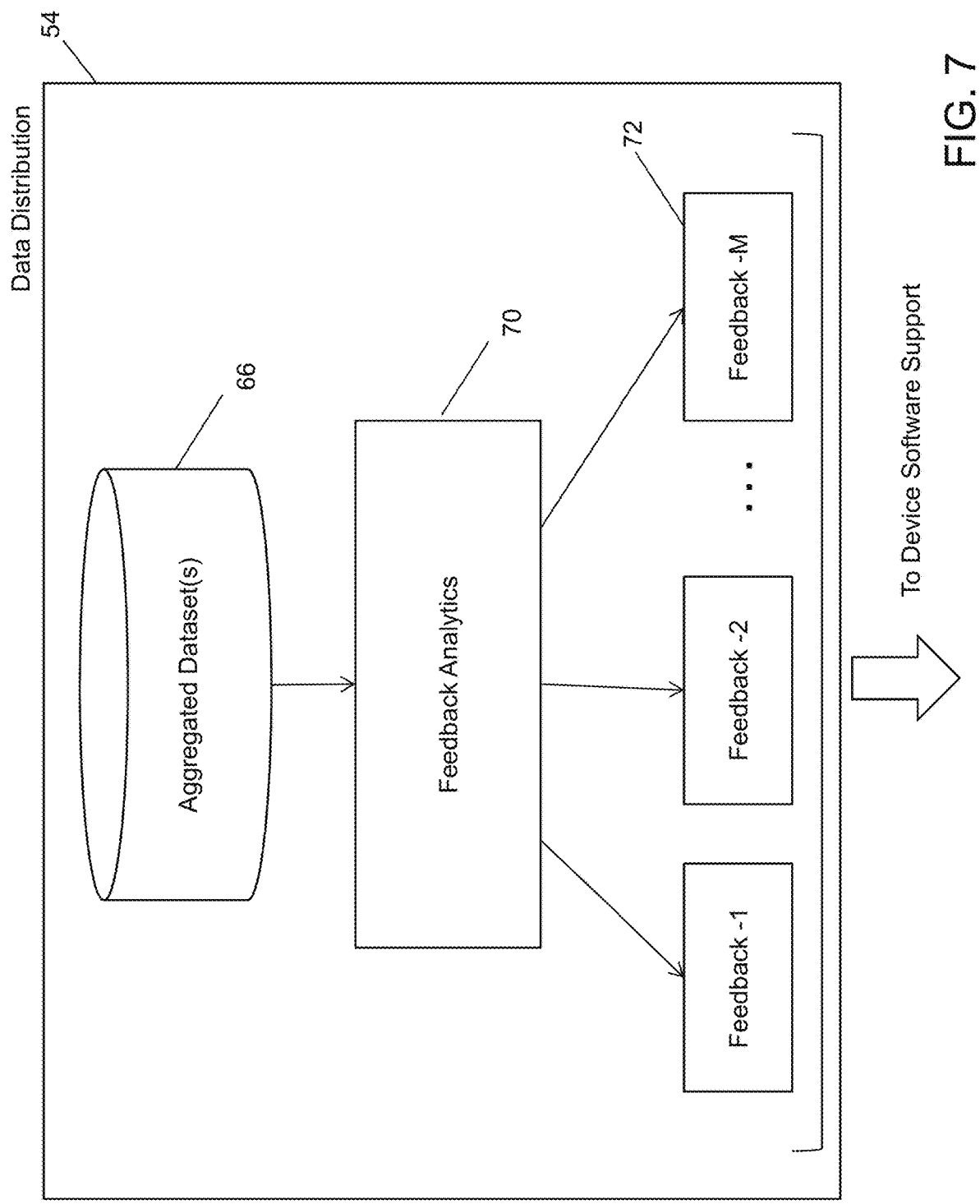
FIG. 7 is a schematic diagram illustrating a configuration for a data distribution module to perform feedback analytics for distribution to devices.

FIG. 7 illustrates at a high level the use of the aggregated dataset(s) 66 to perform subsequent analyses using a feedback analytics module 70. This allows the analysis to be performed on data that has been aggregated or "stitched" across the data types, app types and network types to provide more meaningful feedback 72 that can be tailored according to different devices 12, different apps 38, utilization in different regions, on different networks or network types, etc.

Figure 8:
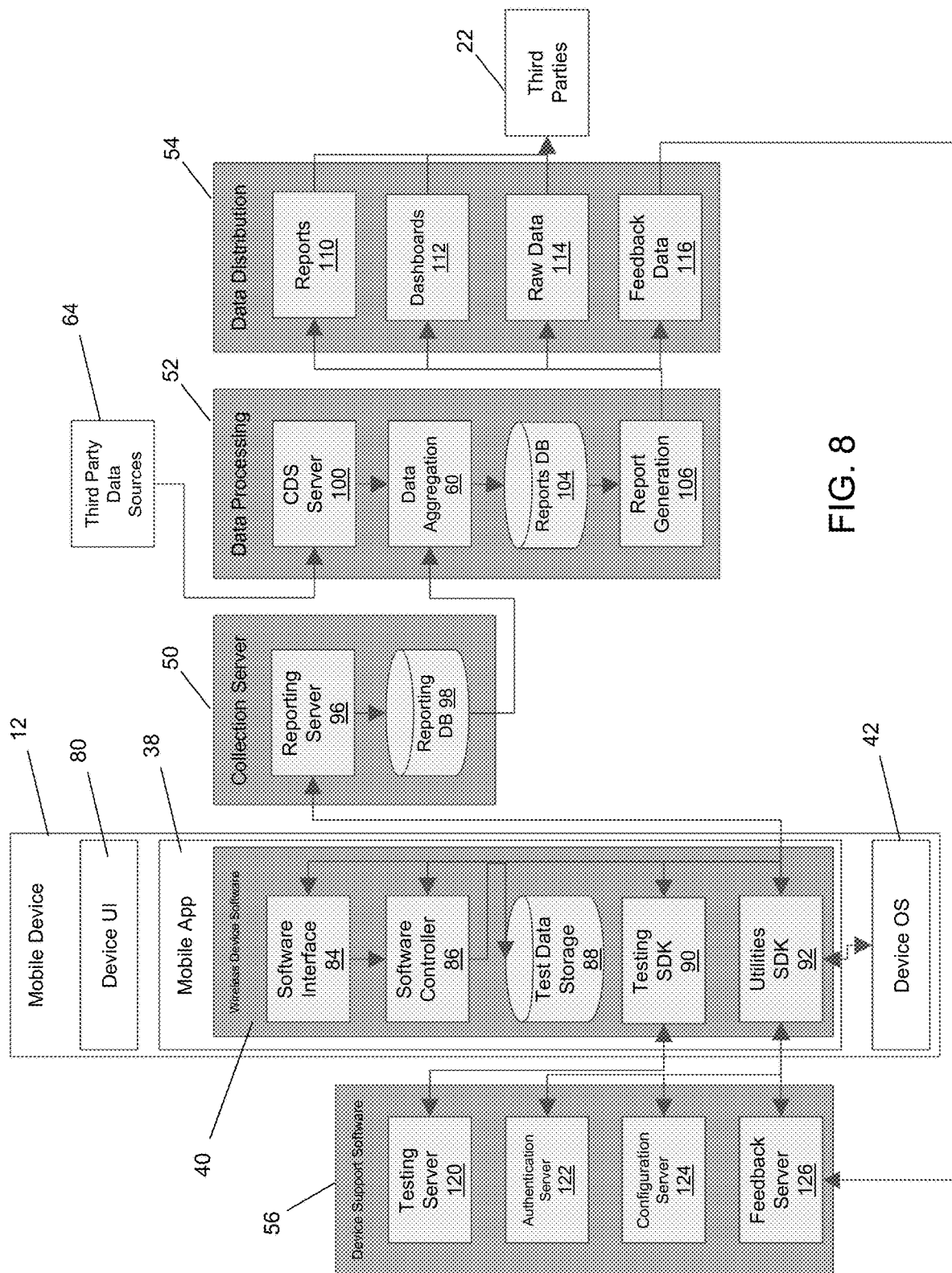
FIG. 8 is a block diagram illustrating additional detail for the configuration shown in FIG. 4.

Further detail concerning the functional blocks shown in FIGS. 4 and 5 is provided in FIG. 8. Beginning with the mobile device 12, the WDS 40 in this example is embedded in a mobile app 38 and includes a software interface 84 for interfacing between the app 38 and a software controller 86 for controlling the tests and other operations of the WDS 40. The WDS 40 also includes a test data storage 88 for storing data acquired during the tests, a testing SDK 90 for performing one or more particular tests that involve operation of the app 38 and/or the device itself via the device OS 42. The WDS 40 also includes a utilities SDK 92 that includes methods, functions, and APIs that can be used to pull data and info from the device OS 42. Such methods can be used to export data to the collection server 50.

The SDK 92 is also operable to communicate with the collection server 50. The collection server 50 includes a reporting server 96 for receiving test and any other data being reported by the WDS 40, and a reporting database 98 for storing the test data for use by the data processing module 52.

The data processing module 52 includes a central data services (CDS) server 100 that provides data source APIs for different third party data sources and metadata. The CDS server 100 can also provide local storage for quick responses to the data aggregation operations. The CDS server 100 also interfaces externally with the one or more third party data sources 64 and internally with the data aggregation module 60 discussed above. The data aggregation module 60 obtains (i.e. pulls, requests or otherwise receives) the data collected by the collection server 50. The data aggregation module 60 also performs aggregation of the various data and data types and stores the aggregated data in a reports database 104 to be accessed by a report generation module 106 for generating various types of reports, dashboards, etc. It can be appreciated that data can also be pulled in from third party data sources and not only the collection server. For example external databases can be pulled in that help translate latitude and longitude into city names where the data was collected.

The report generation module 106 can generate various types of data for distribution to third parties 22 as shown in FIG. 8. For example, the report generation module 106 can generate reports 110 and/or dashboards 112, and can prepare raw data 114 to be analyzed elsewhere. The report generation module 106 can also prepare feedback data 116 to be sent to the device support software 56, in this example configuration, to a feedback server 126 that is part of such device support software 56.

The device support software 56 can include various servers that can communicate with and control, monitor, update, fix, kill, or otherwise interact with the WDS 40 in the various devices 12. In this example, the device support software 56 includes the feedback server 126 mentioned above, as well as a configuration server 124 for managing the configurations for the WDS 40, and an authentication server 122 for authenticating the WDS 40 to ensure that it is from an appropriate app and app developer. The device support software 56 also includes a testing server 120 for interacting with the testing SDK 90 for providing and updating/configuring tests and test sets to be performed by the WDS 40.

The WDS 40 can be configured as a software library that is embedded in the mobile device apps 38 in order to report and integrate with the collection server 50 and data processing module 52. The libraries of the WDS 40 can be added to an existing application to collect device, connection, network QoS, Wi-Fi, and application key performance indicators (KPIs). It can be appreciated that using this over the top approach only requires the WDS 40 to have the ability to communicate with the system 18 over an network connection, for example, either on Wi-Fi or mobile. This allows for the flexibility of deploying through a cloud infrastructure anywhere around the world. As shown in FIG. 8, the WDS 40 interacts with the device software support entity 56, which can include different servers with which the WDS 40 can communicate during its operation. The example configuration shown in FIG. 8 includes servers responsible for authentication and initiation (authentication server 122), configuration (configuration server 124), testing (testing server 120), and reporting (reporting server 96) that communicate with the WDS 40. The authentication server 122 can be used to dictate which application programming interface (API) keys and apps 38 are allowed to operate and collect data through the WDS 40. The configuration server 124 can be used to set specific rules and parameters for the operation of the WDS 40. The WDS 40 can also use testing servers 120 to perform active tests on the connected network 14. The reporting servers 96 are used to upload the data payloads from the WDS 40 to the system 18.

As indicated above, the authentication server 122 can be used to verify that applications 38 are using the correct API key for each developer, and to provision each app with a unique deployment key. Each application developer can be assigned an API key, which is used to generate a unique deployment key for each application 38. This deployment key is used to control the configuration of the WDS 40, as well as track the data collected by each application 38.

The authentication server 122 can also check that the app 38 has not been registered with the system 18 previously. This ensures that the data collected through the WDS 40 is associated back to the correct application 38 and developer, e.g., to account for revenue sharing. The authentication server 122 also allows the control of shutting down specific applications or developers from collecting data at any time, e.g. for implementing a "kill switch".

The WDS 40 can be configured to check with the authentication server 122 on first initialization of the WDS 40, and periodically (e.g., every few days) following initialization. This allows for the authentication server 122 to shut off any application 38 from collecting data 16. All communication and data transferred between the WDS 40 and the authentication server 122 is preferably secured and encrypted. For example, the WDS 40 can be given a three day local cache on the device 12 to prevent the WDS 40 from checking in with the authentication server 122 on every initialization to prevent extra traffic or chattiness over the network 14, and to act as a local cache on the device 12.

The testing servers 120 are used to perform active tests on a network 14 through interaction with the WDS 40. The testing servers 120 can host various files of different sizes for performing download throughput tests. For upload throughput tests, the testing servers 120 can provide an un-throttled bucket to upload files of any size. Furthermore, the testing servers 120 can also echo back packets for the corresponding communication protocol (e.g., UDP packets) sent from the WDS 40 for server response tests. Multiple testing servers 120 can be setup as necessary around the world. The testing servers 120 can be deployed on an cloud or on-premises hosting environment. The WDS 40 determines which server 120 to use for performing active tests by choosing the most appropriate server 120 based on the device's geographic location. For example, the closest route may require using undersea cable whereas a server slightly farther away may be able to make use of faster land-based cable (i.e. to account for more than just geographical proximity). The testing servers 120 used by the WDS 40 can be configured through the configuration server 124. All communication and data transferred between the WDS 40 and the testing servers 120 is preferably secured and encrypted.

The configuration server 124 is designed to allow full control over the WDS 40. The configuration server 124 allows the system 18 to adjust data collection frequencies, data reporting frequencies, and the types of data being collect for devices 12 out in the field. Each WDS deployment can be assigned a unique deployment key, used by the WDS 40 to periodically check what data collecting/reporting behaviors the WDS 40 should be adhering to. This allows the dynamic adjustment of the WDS 40 performance to fine tune battery consumption, network chattiness, and other parameters.

A configuration profile held by the configuration server 124 is downloaded to the WDS 40 upon the initialization of the WDS 40. For example, the configuration server 124 may hold a new policy that says "Do not collect data in Country X". That new policy, or that new profile for data collection, would be downloaded and executed by the WDS 40. A new configuration profile is pulled to the WDS 40 on a specified frequency. The WDS 40 can also have a local cache on the device 12 (e.g., three days), of the configuration server 124, to prevent the WDS 40 from pulling configurations from the configuration server 124 too frequently. All communications and data transferred between the WDS 40 and the configuration server 124 are preferably secured and encrypted.

The configuration file/data can be signed by the service with a known, trusted security certificate. The signature is passed down with the configuration server's configuration where it is verified in the WDS 40 on the device 12. The WDS 40 may then try to match the signature on the server configuration with one generated locally on the device 12 using the same certificate as the server side. If the signature generated on the WDS 40 does not match the one provided by the configuration server 124, the WDS 40 can be configured to reject the configuration and continue to use the previous configuration, or a default. This co-signing verification between the server 124 and WDS 40 ensures that the configuration is not compromised. Compromising the configuration supplied to the WDS 40 can have varying degrees of impact on the user device, the amount of data used, the battery impact, etc.

With the configuration shown in FIG. 8, the following process flow can be implemented. The WDS 40 can initialize by checking with the authentication server 122 to run or not. The WDS 40 then pulls a configuration file from the configuration server 124 to direct the operation of the WDS 40. Data is then collected by the WDS 40 by interacting with the device OS to capture various KPIs about the device, network connection, network QoS, WiFi scan information, and application data usage, etc. as discussed herein. The WDS 40 can also perform network performance tests against the testing server(s) 120.

Data is collected by the WDS 40 and stored in a database (e.g., SQLite) over a particular time period, e.g., a 24 hour period. The database is then exported to the reporting server(s) 96. The reporting servers 96 can parse through the database to split the data into different tables, e.g., within BigQuery. In this example, the data is stored in various BigQuery reporting tables depending on the type of data. On a periodic basis, e.g., hourly, dataflow jobs can be run to add additional metadata to the raw data uploaded from the WDS 40. This metadata includes tagging the raw data with country, region, and city metadata, etc. Once the data is processed by the dataflow jobs, data is made available in various tables and views. These tables and views allow raw data export or building visualizations and standard reports with other tools as herein described. It can be appreciated that standard reports, custom reports, customer dashboards, and raw data can all be made available through a combination of custom reports and dashboards or through different views and exports from the tables (e.g., from BigQuery).

Figure 9:
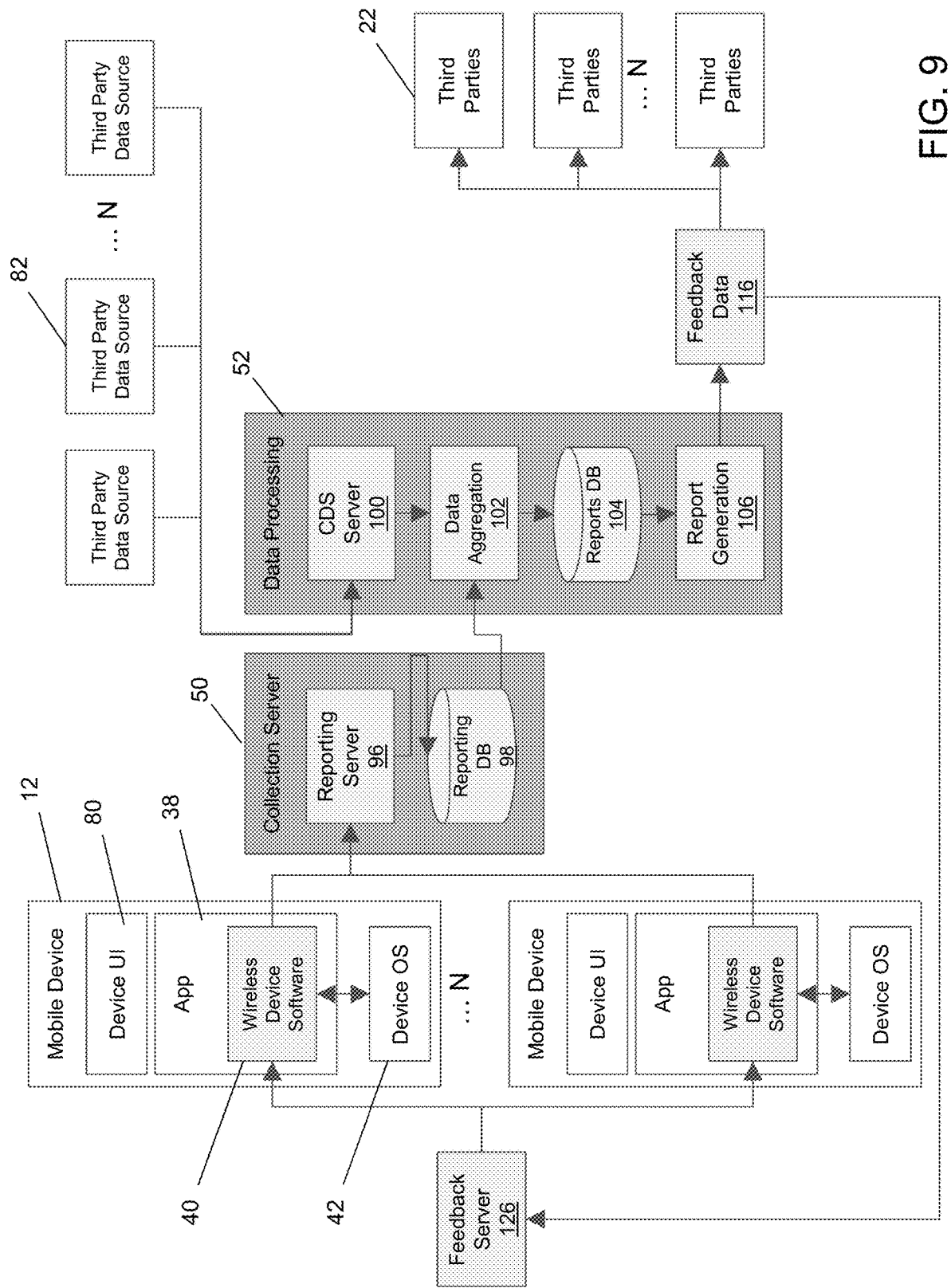
FIG. 9 is a block diagram illustrating a configuration in which a feedback server is used to communicate feedback data to mobile devices.

As illustrated in FIG. 9, the collection server 50 is configured to collect data from multiple mobile devices 12 by having the reporting server 96 interfaced or otherwise communicable with the WDS 40 in each of the multiple devices 12. It can be appreciated that while the collection server 50 can communicate with multiple devices 12, the wider system can include multiple collection servers 50, e.g., regionally placed, each collection server 50 being capable of communicating with the data processing module 52. FIG. 9 also illustrates that the feedback data 116 generated by the report generation module 106 can be provided to multiple different third parties 22 in addition to the feedback server 126. The feedback server 126 can be configured to communicate with multiple mobile devices 12 via the respective WDS(s) 40.

Figure 10:
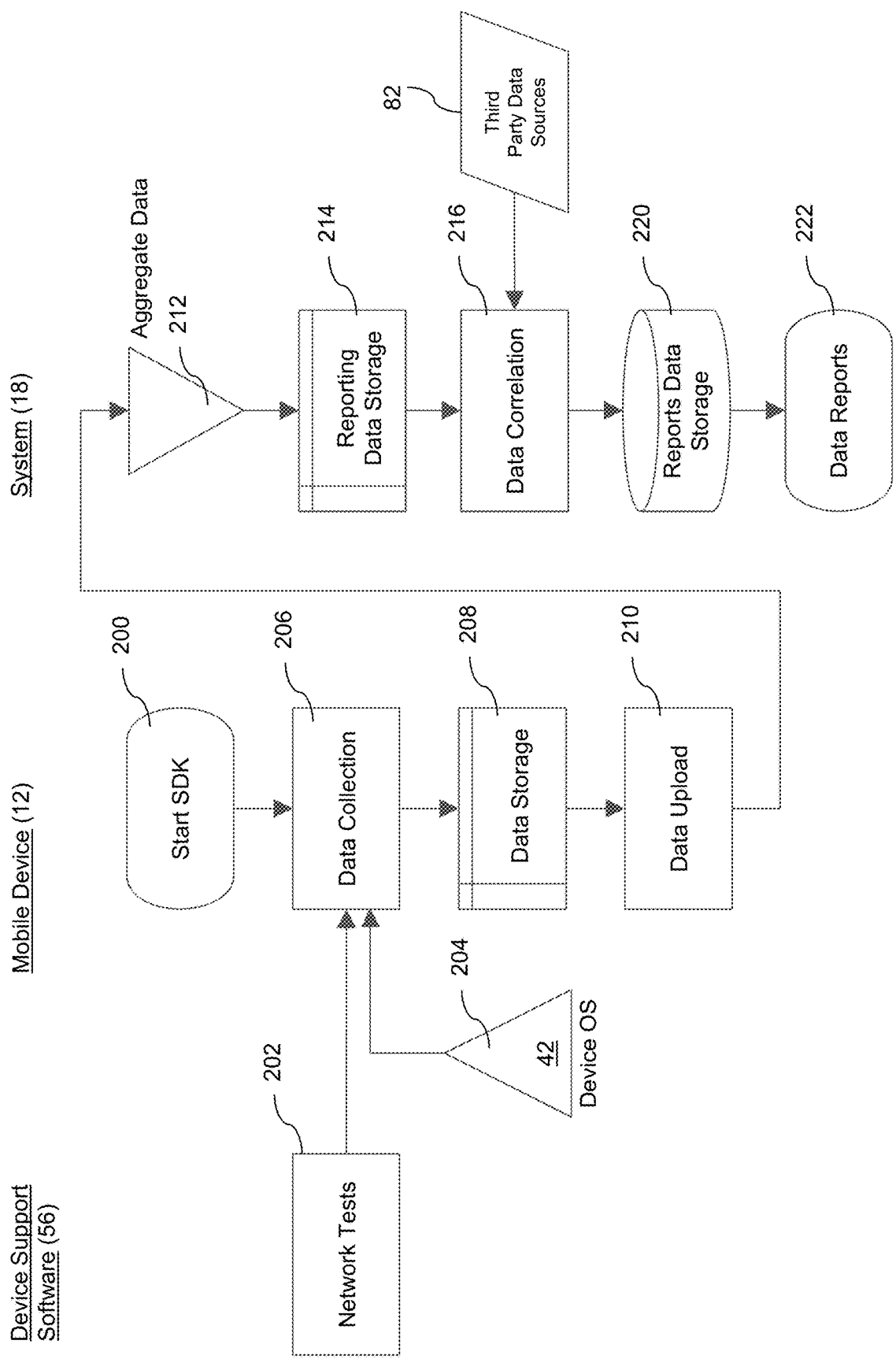
FIG. 10 is a flow chart illustrating computer executable instructions performed in aggregating data from a plurality of devices.

FIG. 10 illustrates data flow in gathering, aggregating, and analyzing data from mobile devices 12 for preparing and providing reports and/or raw data. At step 200 the mobile application (or operating system, etc.) that contains the WDS 40 initiates the WDS 40 to begin collecting test data collection on the mobile device 12 at step 206. It can be appreciated that as shown in FIG. 2, the OS 42 or other components of the device 12 can be used to initiate the WDS 40 to begin the data collection. The data collection at step 206 is performed based on network tests performed in connection with the device support software 56 at step 202 and by communicating with the device OS 42 at step 204. The collected data is stored at step 208 and uploaded to the system 18 at step 210. The uploaded data is collected and aggregated at step 212 and stored at step 214 in the reporting data storage as noted above. The aggregated data can be correlated in various ways at step 216 by referencing third party data sources 82 in order to generate and store reports data at 220. This enables the various data reports to be provided at step 222.

The data can be aggregated at step 212 by adding the uploaded data to a large set of tables, e.g., split by day. The large set of tables can then be queried according to certain variables. In one configuration, data for all apps 38, devices 12 and networks 14 can be placed in the same data storage, and can be grouped in various ways depending on what is meant to be shown in the reports, dashboards, etc.

The data is analyzed in various ways. For example, the data can be broken down by country, region, city, etc.; as well as by time periods (e.g., month). Custom groupings can also be performed by network type (2G vs 3G vs 4G) and statistics determined and displayed for those groupings. Custom groupings can also be performed to determine application package names, application names. It can be appreciated that determining application package names is non non-trivial since a single application can have multiple packages as part of its installation, and also different names in different languages. The system 18 is configured to coalesce the packages to obtain a single-language list of app names and their associated package names (since package names are globally unique). Custom groupings can also be prepared for service providers based on mobile country codes (MCCs) and mobile network codes (MNCs). This allows brands to be matched up with operators for a given network 14, rather than relying solely on the network 14 reported by the device 12 (e.g., since there may exist a roaming situation or other scenario where the provider listed by devices 12 may be inconsistent).

The system 18 can therefore combine the uploaded data from a multitude of different mobile applications 38 and deployments from a multitude of devices in various networks, regions, etc. The system 18 is also able to pull additional metadata 64 from several other third-parties and open data sources 82. The system 18 can output raw data files as well as make data available for visualizations through user interfaces (e.g., dashboards).

For example, a set of the dataflow jobs can be used to add additional metadata 64 to the raw data being uploaded from the WDS 40. These dataflow jobs can be performed periodically, e.g., hourly on the last hour of data upload from the WDS 40. The results can then be grouped into daily tables at a particular time, e.g., GMT midnight, for querying.

The following is a summary of the processes that can take place throughout the dataflow jobs:

1. For many fields, enumerators can be used in the WDS 40 for simplicity and for reducing the amount of data uploaded. The dataflow jobs can be used to swap out the enumerations for human-readable strings.

2. Country, region, and city tags can be added to the data based on the reported latitude and longitude.

3. The geohash can be calculated for the reported latitude and longitude.

4. The device storage remaining and device memory remaining can be calculated.

5. Mapping from MCC and MNC to a service provider branding can be added.

6. Mapping from an application package name to application name can also be added.

It can be appreciated that several open and paid third party sources can be used to complement the raw data collected by the WDS 40.

The data reports generated at step 222 can therefore be constructed in various ways and, if desired, additional third party data sources 82 can be incorporated. Since the data is collected from a multitude of WDSs 40 deployed within various types of applications running on various types of OSs 42 and device types; all within, crossing between and/or interacting with various network types 14 and regions; a more comprehensive view of how a network, device, application, operating system or electronic environment more generally can be assessed. The data that is collected and stored can be queried in many ways for many purposes to suit the needs of different third parties 22 wanting access to such a wider and more complete set of data. Since the WDS 40 can be deployed within various types of apps 38, such as games that enjoy substantial circulation and reach across multiple platforms, regions, an unobtrusive tool is deployed and can be leveraged gather such desired data on a periodic and ongoing basis without adversely affecting the performance of the devices 12 or apps 38.

Figure 11:
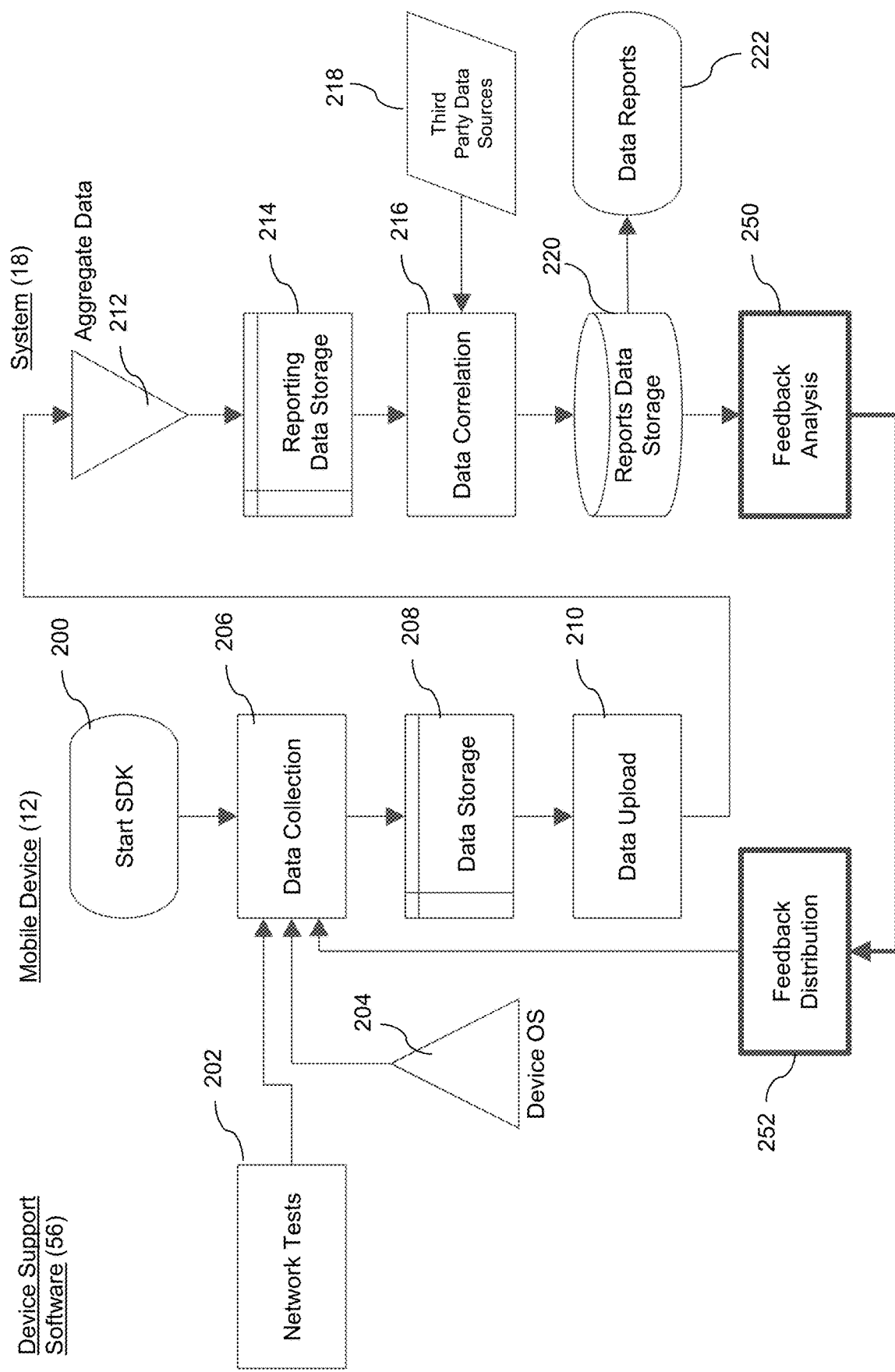
FIG. 11 is a flow chart illustrating computer executable instructions performed in analyzing and distributing feedback data.

FIG. 11 illustrates a process flow similar to FIG. 10, wherein the data stored at step 220 can be additionally used to conduct feedback analyses at step 250 (e.g., as shown illustratively in FIG. 7. While the reports provide feedback in the form of raw data, analyzed data, graphical user interfaces, dashboards, etc., the data that is collected can also be used to distribute feedback to and affect the operation of the WDSs 40 and the mobile devices 12 themselves. As shown in FIG. 11, the feedback analysis at 250 can be followed by a feedback distribution stage at step 252 to complete a "feedback loop" with the data collection operations performed at step 206. The feedback can be used in various ways. For example, it could: 1) affect the WDS 40 to change how/when data is collected; 2) affect the mobile application itself; and 3) affect the device. For 2), one can consider a case where it is identified that all networks in a particular city are particularly slow. A game in that city may choose to download lower resolution images or avoid gameplay features that require interaction with many other players or avoid asking the user to buy anything since the credit card payment may fail. For 3), the mobile device 12 could decide to use a different type of network based on the information that is in the feedback package, or in a SON-type use case the feedback could direct the device 12 to connect to a specific cell tower. In the case of 2) and 3), the actions taken will ultimately affect the type and quantity of data collected by the WDS 40.

Figure 12:
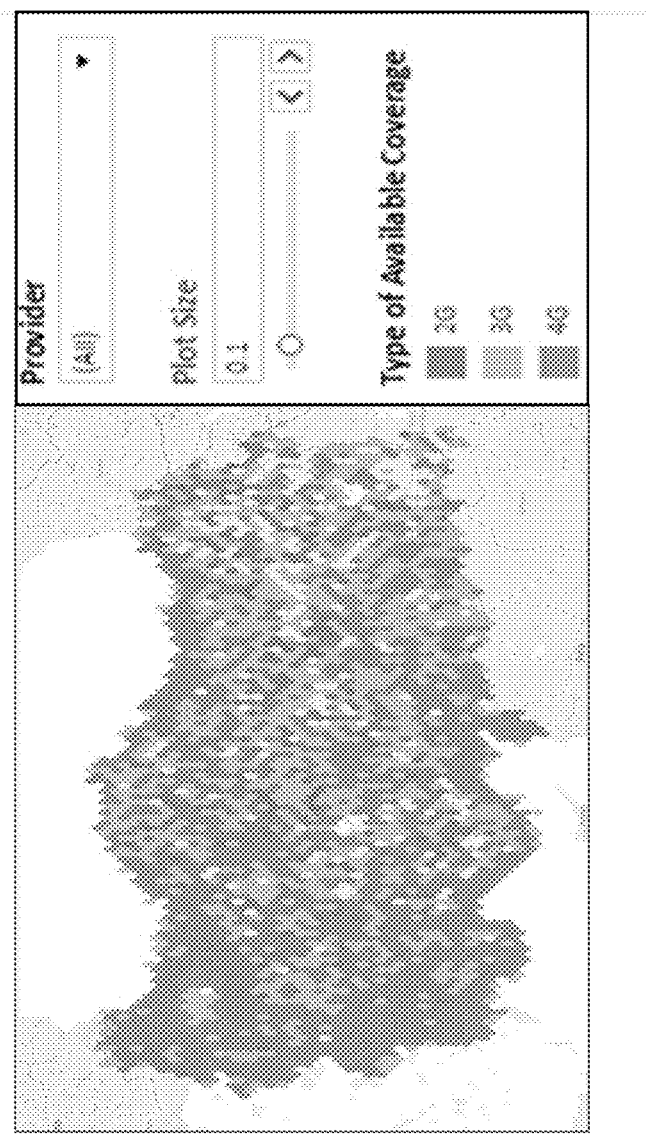
FIG. 12 is a screen shot of an example user interface for displaying network coverage availability for a region.
Figure 13:
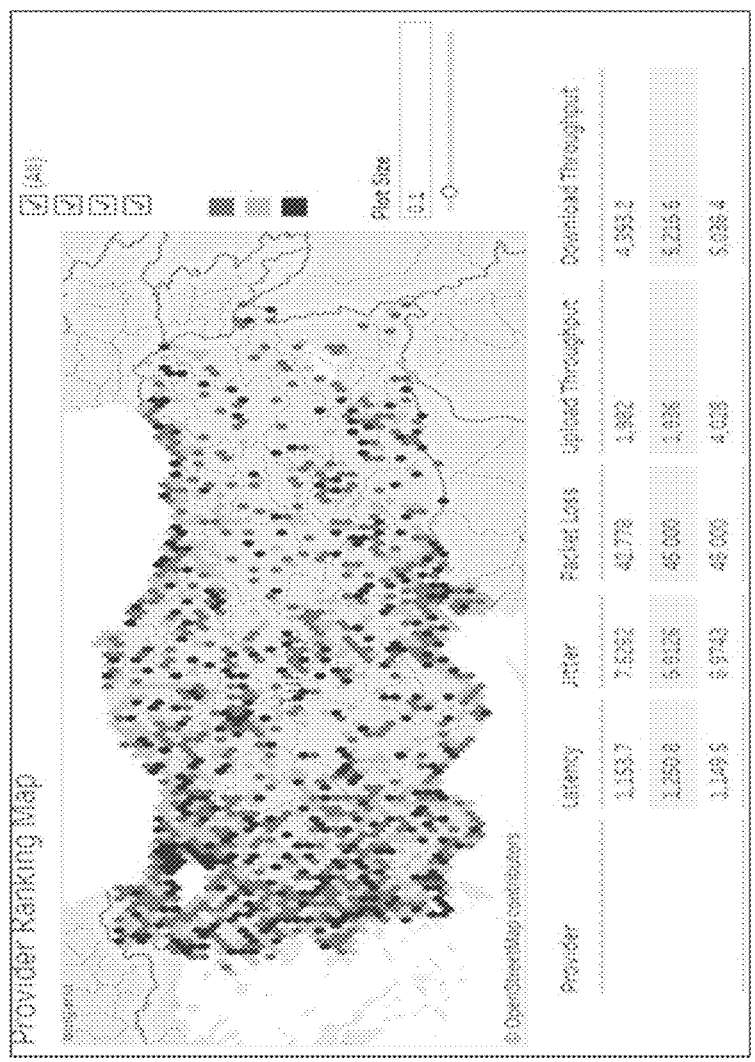
FIG. 13 is a screen shot of an example user interface for displaying a best provider map.

FIGS. 12 to 19 illustrate screen shots of example user interfaces that can be generated using the data collected from devices 12 as herein described. FIG. 12 illustrates an example of a hex map showing coverage availability for 2G/3G/4G networks for a particular geographic region. The performance is shown in coloured hexagons of consistent size, with the radius being dynamically re-sized for different applications. FIG. 13 illustrates another hex map with network provider rankings. It can be appreciated that for both FIGS. 12 and 13, specific key performance indicators (KPIs) can be shown, as well as radio technology coverage, operator comparisons, and other data types. The hex maps shown in FIGS. 12 and 13 can be useful for seeing pockets of coverage type and quality in certain areas, seeing competitor and roaming partner experience, and identifying areas of poor experience (e.g., high packet loss, etc.), among others.

Figure 14:
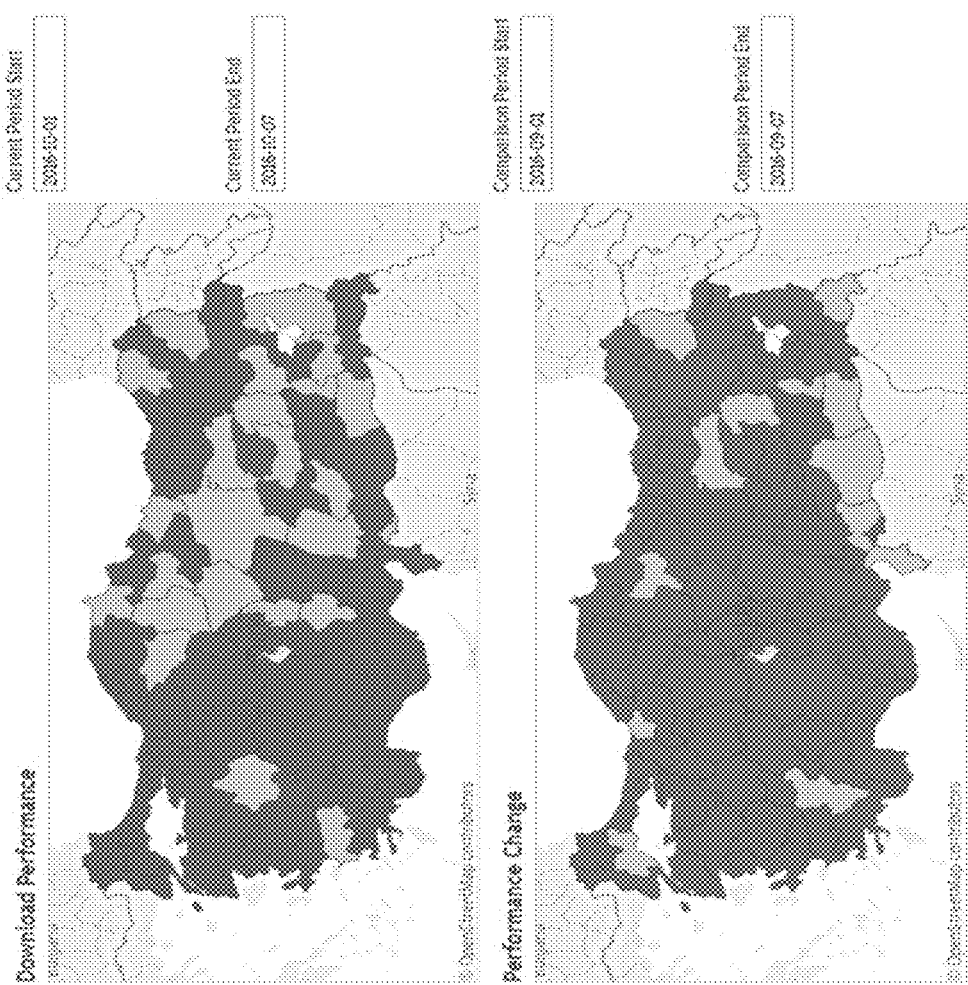
FIG. 14 is a screen shot of an example user interface for displaying download performance and performance change for a region.

FIG. 14 illustrates two examples of region maps, one showing download performance, and the other showing performance change for specified time periods. The region maps can be used to show regions of interest and can be set to a particular country, region, postal/zip code, etc. Colour coding can also be used to allow comparisons between regions. Such region maps can be useful for identifying performance quality or lack thereof in regions of interest, as well as the ability to see area performance for customer support and marketing purposes. For example, by having data from multiple network types 14, carriers can determine metrics such as "the best provider in your postal area", etc.

Figure 15:
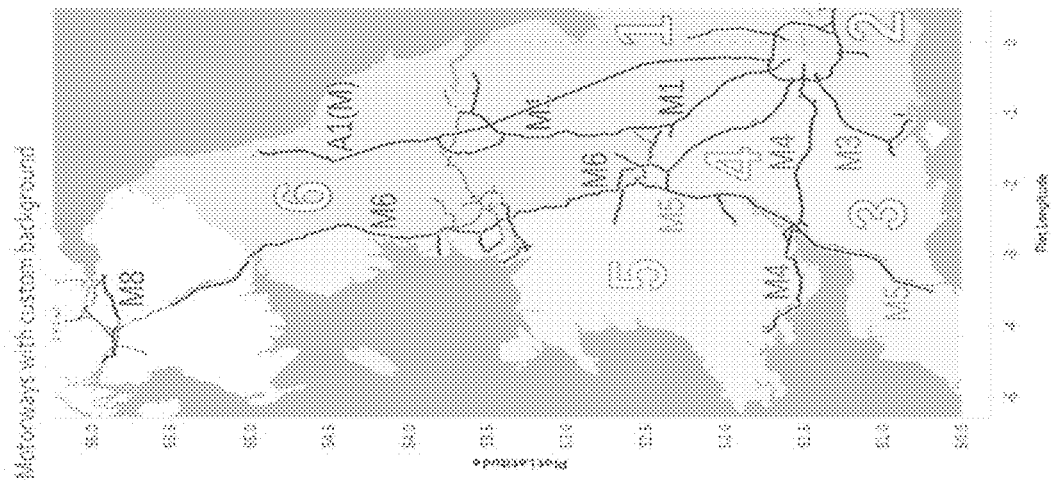
FIG. 15 is a screen shot of an example user interface for displaying network quality of service (QoS) for highways in a region.

FIG. 15 illustrates a regional map with highways and other points of interest (POIs). This allows for network QoS to be shown relative to highways and other POIs like airports, train stations, train/transit lines, sports stadiums and other places that users may gather and expect or desire good network coverage. The screen shot shown in FIG. 15 can also be incorporated into a user interface or dashboard that allows a user to drill down into specific venues, junctions, and isolate based on date ranges. Also, the data that is collected by the system 18 can also be used to allow users to drill down into various KPIs such as download speed, latency, packet-loss, etc., therefore allowing service providers, venue operators and other interested parties to determine network QoS for metrics in which they are interested.

Figure 16:
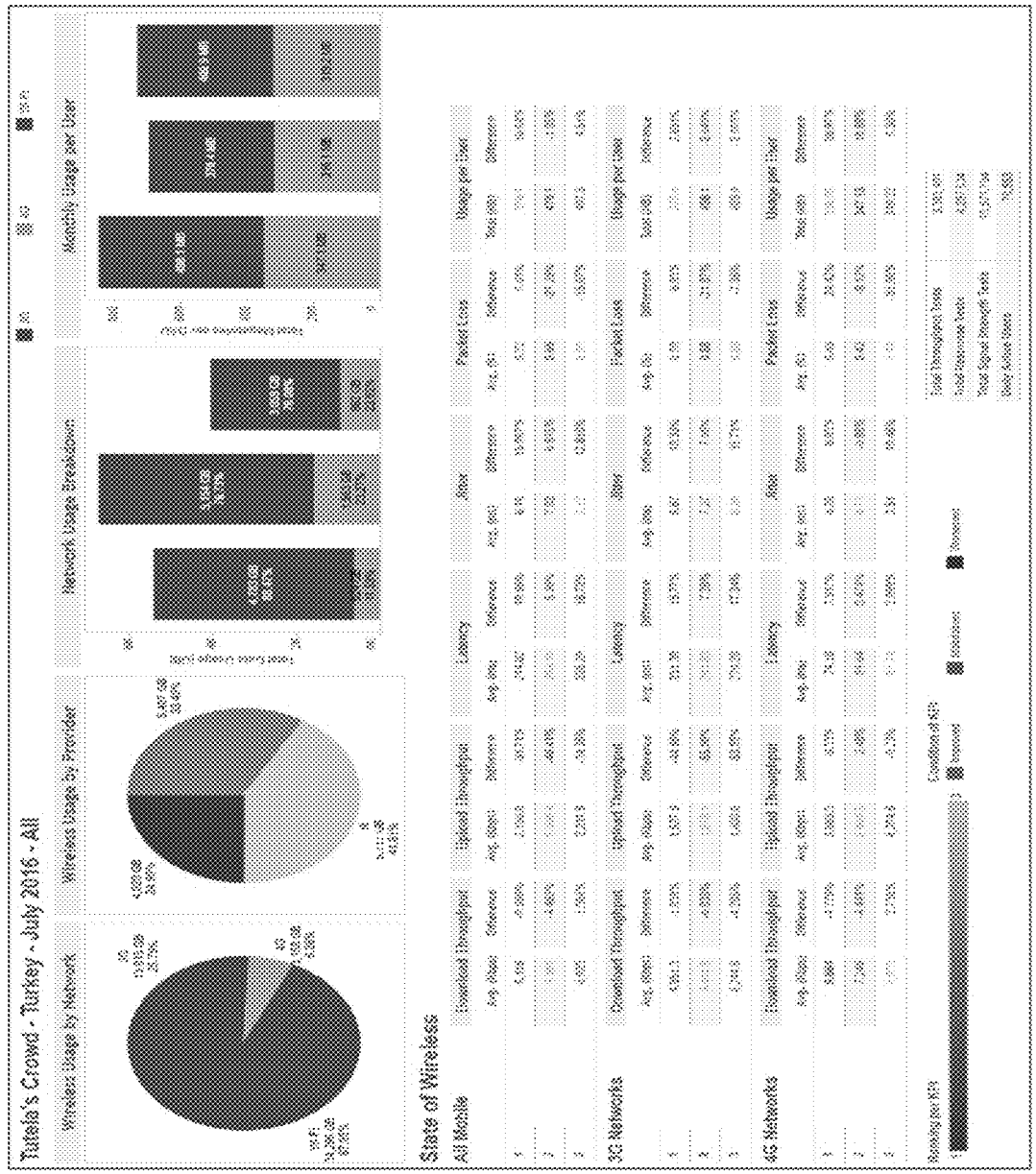
FIG. 16 is a screen shot of an example user interface for displaying network statistics for all operators in a selected geography.

FIG. 16 illustrates a screen shot of a user interface for displaying overview statistics for a particular region. In this example, network statistics are shown for all operators in a selected geography and the data can be displayed for specific date ranges. Since data is collected by the system 18 over a multitude of devices 12 in a multitude of networks and network types 14, the overview provided in FIG. 16 can be obtained and periodically updated over time. The information provided can be useful for competitor benchmarking, since data concerning other networks is available, as opposed to only having data for one particular network. The data shown in FIG. 16 can also be useful for making roaming partner selections, since a network can obtain data for all operators in a particular region and can assess the quality of service that can be expected should they choose that roaming partner.

In addition to the overview stats, other views can be provided, such as QoS trends to show trends for certain KPIs, with selectable geographical and date ranges. QoS trends can be used to issue resolution and performance monitoring. Regional performance tables can be provided to show network QoS performance broken down by region (e.g., city) and by operator in selected countries. The tables can be colour coded to highlight improvements or degradation. These tables can be useful for competitor benchmarking, roaming partner selection, and for identifying areas requirement investment/improvement. Device performance statistics can also be provided to show performance by device and how these devices compare when used on home and competitor networks. Device performance statistics can be useful for device manufacturer considerations and issue resolutions, recalls, warranty issues, etc. Similarly, app usage statistics can be provided to show, for example, total active users, total data usage, etc. The app statistics can be filtered by geography, operator, device type, radio technology, etc. The app statistics can be considered useful for determining trends in user behaviour (e.g. growth in app types), and for optimizing networks for popular applications. The data gathered and analyzed by the system 18 can also be used for infrastructure planning tools in which poor performing locations or infrastructure can be displayed on a map. These maps can be made interactive such that clicking on a location displays a street-view to search for possible infrastructure locations, etc. The maps can also display a list of local businesses for potential partnership (e.g., for small cell or WiFi access points).

Figure 17:
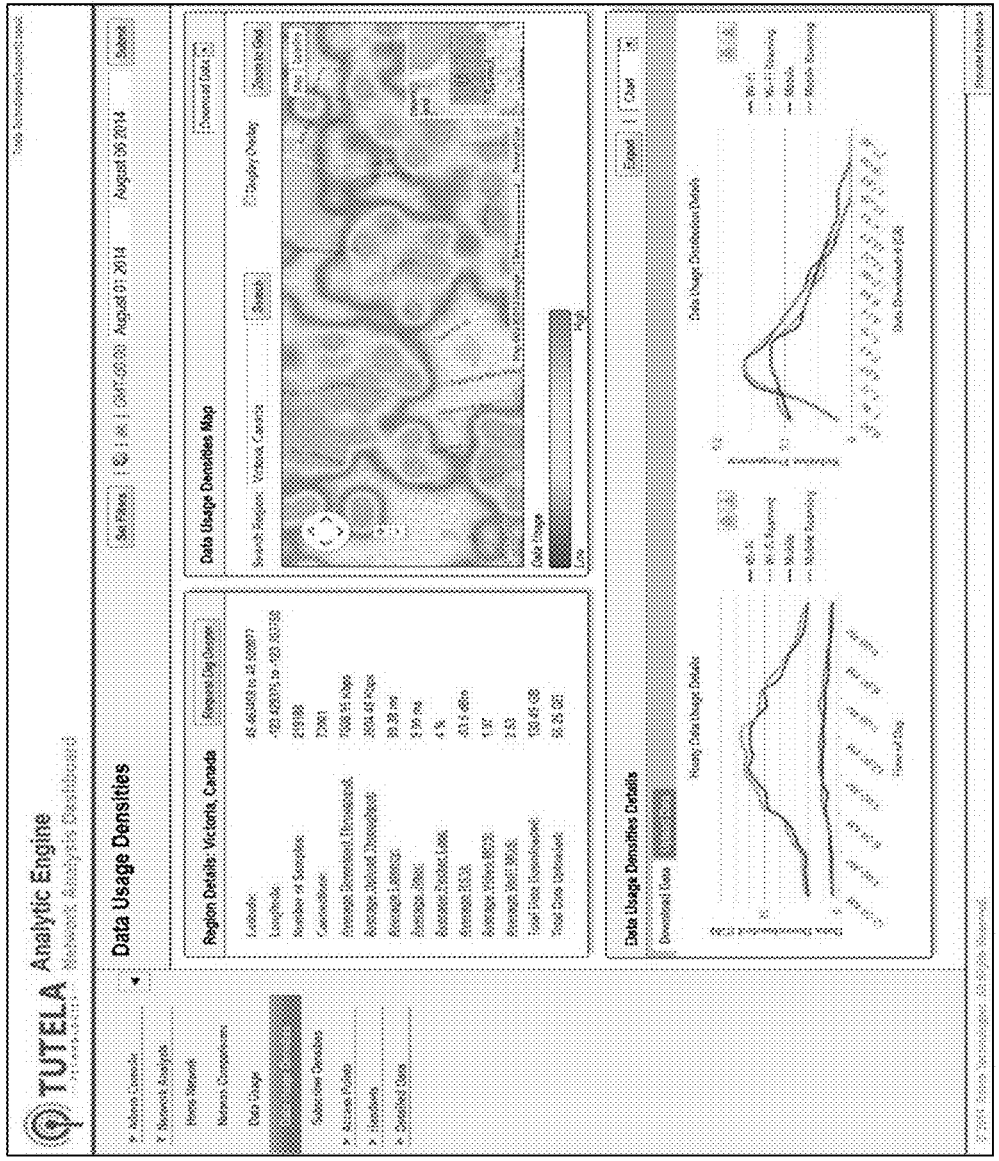
FIG. 17 is a screen shot of an example user interface for performing web-based network analyses.
Figure 19:
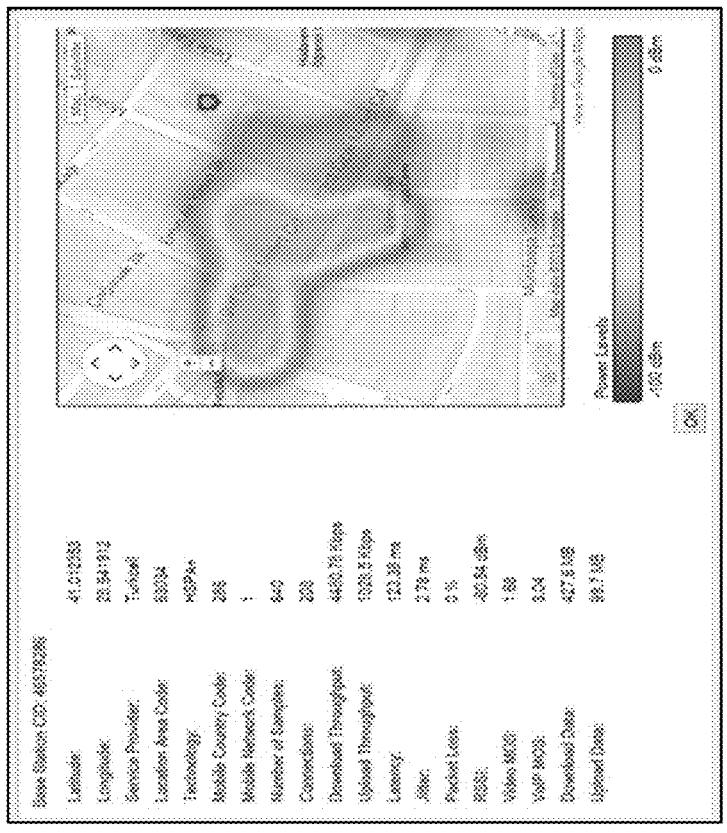
FIG. 19 is a screen shot of an example user interface for displaying micro-level network performance details.
Figure 18:
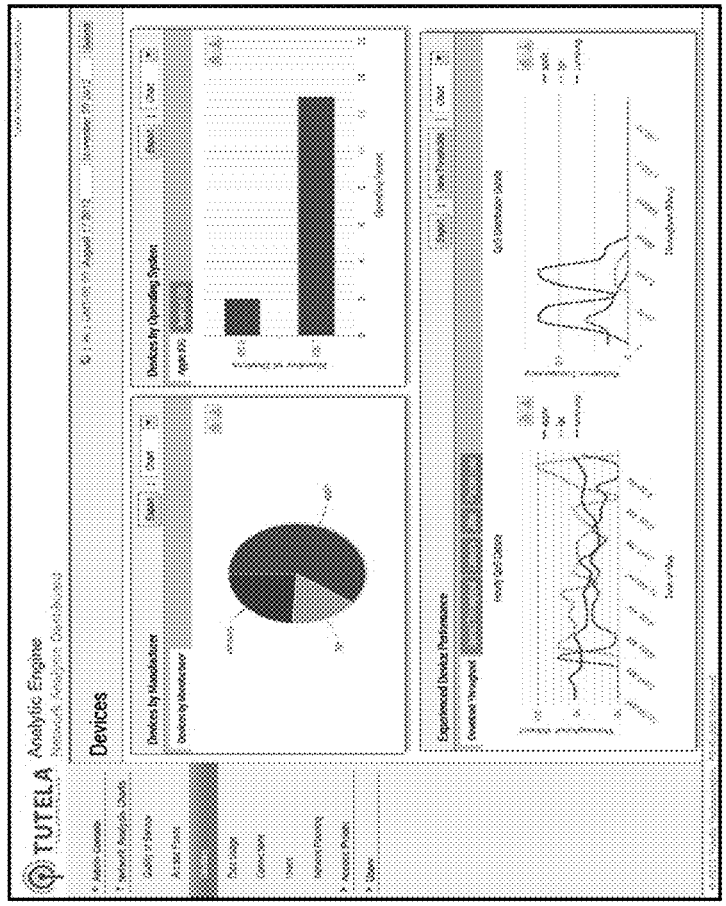
FIG. 18 is a screen shot of an example user interface for displaying macro-level trends.

FIG. 17 illustrates an example of a web-based platform that can be provided to conduct network analyses. The network analysis dashboard in FIG. 17 can utilize multiple panes or portions with options to deep-dive to street level and cell-tower performance analysis, select different statistical tables or mappings to be displayed, etc. The dashboard shown in FIG. 17 can be used for infrastructure planning and validation. For example, the dashboard can be used to display device statistics for understanding macro-level trends, as shown in FIG. 18, or to show detailed network coverage mappings of areas and venues as shown in FIG. 19.

In addition to providing a system and method that enables wireless device and wireless network performance and wireless network usage trends to be evaluated by embedding wireless device software in the background of a plurality of applications (or operating systems) deployed and running on a plurality of device types and across a plurality of network types, to enable an aggregation of data types for the analysis and reporting of a more meaningful dataset as described above; various other applications, configurations, and use cases making use of or configuring the underlying system 18 will now be described.

User Informed Testing

The system 18 described above contemplates testing networks 14 and generating test data in a few different ways, namely:

a) Requesting the mobile device OS 42 for information (i.e. device API calls).

b) Creating network traffic and running "active tests". For example, determining the throughput of a network by downloading a file from a controlled testing server 120 then watching the performance of that owned and controlled download. In this case, the network traffic being analyzed was created for the express purpose of performing a test.

c) Watching network traffic initiated by the user or some other mobile device service that has not been generated for the specific purpose of performing a test, i.e., a "passive test". For example, a network testing service can examine how quickly a user is able to upload a photo on Facebook or download a YouTube video, and then determine throughput by passively watching the performance of those non-controlled operations.

It is recognized that access to more user information makes it possible to enhance these three types of tests. For example, the actions, behaviours, or locations of the users (or mobile services) could dictate which of the three types of tests to perform. These same actions, behaviours, or locations could also provide additional information which can inform the approach to testing or how the results should be interpreted to generate more valuable and accurate insights.

Traditionally, passive testing has been found to be less accurate than active testing. This is because less is known about the traffic being analyzed, that is, passive testing is less controlled. The system 18 described herein can be configured to perform network tests that are either initiated by user actions, or informed by user actions. This can be done by being given, or otherwise having access to, additional user or mobile service information, which can greatly enhance passive testing (and testing in general). This is because mobile apps 38 can track user actions such as the user clicking a button to upload a photo. When the mobile app 38 sees that a user has clicked the button "upload photo", it can run a passive network test on that data upload while knowing: 1) It was a photo; 2) the size of the photo being uploaded; and 3) the destination server address. In other words, the mobile app 38 and WDS 40 are in a position to leverage an increased understanding of the nature of the file transfer to perform a more effective and accurate passive throughput test. This can be done, for example, by having the WDS 40 utilize an API to ingest information from the mobile app 38. In this way, the mobile app 38 passes information to the WDS 40, such as "the user just clicked a button to upload a photo of size x". Accessing this information provides context that may not have previously been available for passive testing, for instance when a file has been uploaded, not knowing that it was a photo, the resolution or size of the photo, or the destination server and routing details.

The system 18 can therefore be adapted such that the user's interaction with a mobile service would dictate what type of passive network test to perform and how to interpret the results. For example, if the user uploads a photo on a particular mobile service such as Instagram, the system 18 can use that additional information to perform a passive network test that is designed to monitor the network's ability to handle photo uploads. This additional information can be provided by a mobile application 38 and is typically provided by the mobile application 38 which contains the network testing code—however other sources for that additional information are possible. In this event, the system's passive test would have access to additional information such as: 1) that the user is trying to upload a photo; 2) the size of that photo; and 3) the destination sever, etc.

It can be appreciated that user informed testing does not need to be limited to passive network tests. The mobile user's behaviour, characteristics, location, etc. could dictate specific active tests which should be run based on the types of tests desired by the controller of the system. User informed testing also allows the system to consider when an active test or a passive test would be most appropriate. For example, it may be best to only run passive tests, which don't create more new network traffic, when the user is watching a video or doing something with their device 12 which is sensitive to network performance. In other words this "additional information" and user informed testing can help dictate when and where tests should be performed to: 1) not interfere with user experience, or 2) provide the information which is most needed by the system.

Furthermore, as wireless networks move more and more towards being virtualized or software defined, the user informed test results can be used to modify or dictate the hardware, software or implementation of the network 14 itself by informing the network's requirements based on the services and applications 38 being used by users and the actions they take.

The system 18 described herein can therefore be used to perform user informed/dictated testing, that is, where the user does not specifically choose to run a network test. In this case, network tests are selected and initiated based on the actions performed by a user of a mobile device 12 which contains the network testing software (e.g., downloading a photo). The details of those actions performed by the user can be used as an input into the analysis of the results (e.g., a network's ability to serve a photo). The action performed by the user is something that is not the user choosing to run a network test.

It can be appreciated that while the above examples are in the context of knowing more about a user, and the in-app buttons such a user would select, it could equally be a non-human service that provides the additional information.

Device Churn Tracking & Advertising

The above-described systems and methods contemplate tracking mobile devices 12 as they access and make user of wireless networks 14. These mobile devices 12 and their users can be identified and tracked on a day-to-day basis in various ways, including:

a) The mobile device ID: For example MAC Address, IMEI, or IMSI of the mobile device.

b) The advertising ID of the device: Advertiser ID or IDFA are non-persistent ID's of the mobile device 12 used to serve targeted mobile advertisements.

c) Cookies: IDs that are installed on devices as they access and use networks and network services.

d) The mobile software ID (or WDS ID): A unique ID generated by mobile device software to identify a specific installation of the software.

e) An ID used to log-in to mobile software: For example, a Facebook ID, Netflix ID or Gmail ID that is used by a user to log-in to a mobile application 38.

f) A set of behaviour characteristics: For example, a set of characteristics, which may be defined based on a number of factors which may include locations of the device, IP addresses used by the device, or WiFi/Cellular access points generally used by the user.

Each device tracking approach has its own privacy implications which typically needs to be considered and managed. That is, a selected tracking approach would normally need to be both acceptable to the mobile device user and certain legal requirements.

By tracking how these IDs flow through networks 14, the system 18 may be used to inform wireless service providers about user churn. For example, if an application ID is used to log-in on a phone on a first network 14*a* one day, and then later the same application ID is used to log-in on a phone on a second network 14*b*, then it can be reported that this user likely churned. That is, in this case it can be expected that this user left the first network 14*a* and became a customer on the second network 14*b*. Such churn reporting on its own provides a valuable service to wireless providers. However, this reporting becomes even more powerful when combined with other data sets to enable predictive capabilities which create the possibility of advertising to influence churn.

For example, this historical network churn information when combined with other information sets such as wireless network coverage, wireless network performance, website cookies, recent searches, mobile device hardware/software, user network subscription plans, what people are saying about the wireless network operator on social media, and other information sets, can be used to perform churn prediction on individual users or on large aggregate portions of the population.

This enables enhanced targeted advertising by wireless operators to users who are either: 1) high probability candidates to leave their network 14; or 2) high probability candidates to leave their competitor's networks 14. The same mobile IDs can be used to target specific users or IDs with appropriate advertisements.

As an example, the system's wireless network performance tests can be used to compare networks and inform targeted advertising campaigns. If the second network provider discovers that they are the best wireless network in a specific city they could adjust their advertising to devices in that city to promote their network as being the highest performer. It is then possible for mobile applications 38 and services to suggest wireless operators to their users. Users may opt-in to allow a wireless service, such as Facebook, to track network performance, their usage patterns, and location and then suggest to them the best wireless network 14 for their requirements.

As an alternative approach to tracking user churn, the system 18 may track which groupings of mobile devices 12 tend to show up on specific networks 14. For example, if the same four mobile devices consistently access the same WiFi access point, or access networks via the same IP address, it is reasonable to assume that this is a family unit or associated group. If suddenly one of those devices 12 leaves that grouping and a new device 12 appears which is authenticated with a different cellular wireless network 14 it can be reasonably assumed that there has been a network churn event by the user of that newly appearing device.

As such, tracking one or more IDs associated with a user or device 12, and obtaining access to or otherwise tracking user-related events such as social media posts, can enhance churn identification and churn reporting and/or targeted advertising. The system 18 can be adapted for such churn prediction by tracking a user as they move across networks 14 and across mobile devices 12 using their social media log-in IDs, such that an analysis of network/device churn can be performed.

Net Neutrality and Service Level Agreement Tracking

Wireless network performance tracking by the system 18, which can be performed by crowdsourcing from mobile end points as described above, can also be used to determine which areas, users, or services are being throttled; as well as which areas, users or services are being provided with enhanced levels of service.

Identifying and comparing low performance and high performance cases can be used in a variety of ways, for example:

a) To inform cities and governments on which areas are being properly served by wireless service providers. Wireless regulators often require that carriers provide certain levels of service to rural areas and/or less privileged neighborhoods, and violators can be identified and penalized using the testing data.

b) To inform Mobile Virtual Network Operators (MVNOs) on whether or not a home network is providing adequate levels of service or if the home network operator is providing inferior service to the MVNO's subscribers compared to their own. This allows the MVNO to determine if their home operator is in violation service level agreement (SLA) rules.

c) To inform wireless networks 14 on which network 14 they should have their subscribers roam to and whether or not those roaming networks 14 are adhering to or violating SLAs and how the roaming quality experience by their roaming subscribers compares to the quality being received by that network home subscribers.

d) Whether or not net neutrality laws are being adhered to or violated. For example, it can be seen if a network operator is throttling a third party streaming service, and promoting their own streaming service, and to what extent.

The system 18 can therefore be adapted such that the network test results or service quality is compared against a threshold of quality dictated by a wireless regulator or home network provider to see if requirements are met.

Event Driven Testing—Self-Driving Vehicles/Cyber-Physical

Network quality and coverage is often considered critical to certain emerging cyber-physical domains such as self-driving vehicles and ehealth. In these cases, the end mobile device 12 has a core purpose, which is network sensitive. It is important that these devices 12 maintain access to network quality that is good enough to meet their core purpose requirements. For example, an ehealth device designed to inform hospitals of heart attacks should be able to send a message to hospitals or emergency dispatchers when a heart attack is detected.

Network testing capabilities for these devices 12 may then be considered critical to their performance, with test being triggered by events which are inherent to the device's core purpose.

In one example, a self-driving vehicle or vehicle network may choose to run tests whenever vehicles need to perform emergency maneuvers (e.g., avoid an animal or other obstruction on the road) to track the performance of these maneuvers. Alternatively, the vehicle grouping may run tests only in cases when it is known that there are portions of the road or route where network performance information is lacking. In these cases a network testing system can have its tests triggered by external events. The resulting network dataset can be combined with information about the cyber-physical device's operation and requirements to determine if the network 14 is adequate for that cyber-physical device's requirements.

In another example, an e-health device 12 may perform event driven tests on the network 14 to ensure that the network 14 is performing well enough to handle the network requirements of an emergency situation (and that the devices is connected to the appropriate server). Example events in this case may be: 1) User is sleeping or user is in nor immediate health danger; 2) User health reading are reaching dangerous levels which could get worse; 3) User is in danger.

It can be appreciated that in applications such as self-driving vehicles the devices 12 are in a great position to map network quality across huge areas and therefore may be relied upon or otherwise play an increased role in future network testing. It can also be appreciated that vehicles are not just limited to automobiles, and may include drones or other autonomous devices.

Privacy in Mobile Device Testing

The mobile devices 12 used to perform network testing typically need to have the ability to preserve user privacy to degrees that are informed by the user themselves. For example, if a user inputs that they either opt-in or opt-out of the service, or portions of the service, the overall system should be responsive to that input and adjust what is collected accordingly. The analysis and handling of that data should also be informed by those same user inputs.

The system 18 can also be adapted to ensure that it is capable of consuming information about the jurisdictional and geographic difference in privacy rules and be responsive to those rules. For example, a global testing system may perform differently in Russia than in the European Union depending on the current governing privacy legislation in both areas.

It can also be important that the system 18 orchestrate the tests performed amongst the full network of testing end points to preserve privacy of users. For example, the system 18 may choose to distribute the tests amongst the mobile devices 12 in such a way that makes it even more difficult to track the movement or characteristics of a specific device 12. Or, for example, if a specific area is known to be private property and have a very low population density, the system 18 can be configured to be able to handle that data differently, or not collect data from that area, since it would be easier than normal to associate the tests taken in that low-population area with the person or persons known to live in or access that area. There may also be specific geographic areas in which it becomes illegal to run tests or measure location, and the system 18 may need to be adapted accordingly.

MIMO/SON—Interference Suppression and Beam Forming

Multi-input Multi-output (MIMO) and SON systems 22b may have a multiplicity of channels available, each of which is evaluated. Also, MIMO and SON systems 22b can use beamforming to broadcast specific channels and network resources to specific mobile devices 12, namely based on their unique requirements. As a result each user in the network 14 can be experiencing something completely different such that the importance of crowdsourcing network quality increases.

Information crowdsourced from the mobile devices 12 themselves can ultimately be used to inform the network 14 about the network characteristics which are required to be broadcasted to each mobile device 12 and how this beamforming needs to take place (generally based on the application being used or subscription tier of the user). As the waveforming and beamforming takes place, the mobile device's application and network experience information (crowdsourced via the system 18) can be used in a feedback loop to inform the waveforming and beamforming processes.

In other words, beamforming allows every user to get access to different network characteristics. However in order to understand if this is working well, there needs to be a feedback loop informed by network crowdsourcing as herein described.

Security

Abnormal Mobile Device Behavior: The network testing/monitoring agent (e.g. the WDS 40) can be used to detect/identify compromised mobile devices 12. For example, if the WDS 40 normally sees that a mobile device 12, or an IoT device 12, normally only uses 2 MB/day of data, and then that suddenly jumps to 100 MB, the system 18 can be used to identify this abnormal network behaviour and flag the device 12 as possibility being compromised.

Abnormal Access Point Behavior: It is recognized that adversaries are beginning to use rogue access points and fake cell towers to lure mobile devices 12 into connecting. They can then monitor the traffic over the network 14 or use these malicious connections to install malware. The system 18 can also be used to identify abnormal access point behaviours. For example, if users are accessing the same access point from various locations, then that access point may be a rogue access point which is being driven around luring connections. Alternatively, if the cell tower ID, or some other identifier of a cell tower, or a cell tower's characteristics suddenly change, it can be flagged as possibly being a false tower made to appear similar to the non-malicious access point.

The system 18 can therefore be adapted such that the performance and details of mobile devices 12 and network access points are compared against the expected details/performance to search for network issues and compromised systems.

Leaking of Private Network: Certain networks are not intended to be seen outside of specific geographic areas and certain facilities. The system 18 can report if certain networks 14 are seen where they should not be seen.

Additional features which can make the system 18 more secure include:

a) The network of mobile devices 12 can be controlled by several network controllers instead of just one (i.e. system fragmentation). For example, the mobile devices 12 can use a different configuration server 24. It can be appreciated that there may also be benefits in fragmentation, which would require subset populations of devices 12 to use all different servers (i.e. different testing servers 120, different authentication servers 122, and different configuration servers 24). This way if one of the controllers is compromised then the whole system 18 is not compromised at once. In the scope of the above principles, the network controllers are generally used to control which devices 12 run which tests and under what conditions. The network controllers are also used to control which servers are used for those tests. If those servers are compromised, then the entire system could be used to run a DDOS attack.

b) The mobile device agents (e.g., WDS 40) which perform the tests can be setup so that they re-authenticate every so often or they otherwise go dormant. This characteristic can be hardcoded into the WDS 40 so that if the WDS 40 becomes compromised (e.g., to run a DDOS attack) then after a certain period of time the WDS 40 shuts off because it stops being able to re-authenticate.

Example Use Cases

Application Monitoring: The network tests described above can be used to report the performance or likely performance of network applications 38 such as Skype, YouTube, Netflix, etc. without ever interacting directly with the proprietary servers used by those applications. Instead, the network requirements of those applications 38 are understood and compared against the network characteristics being observed and collected by the network testing agent (e.g., WDS 40) in order to report on application performance. The system 18 can therefore be configured such that the results are used to report the performance or likely performance of network applications 38.

Network Operations: The above-described crowdsourcing can provide alarms to network operators indicating specific areas or network access points which are providing less than optimal performance. These alarms and this information can be used to inform network maintenance or indicate which areas of a network 14 require additional testing by other methods. The system 18 can therefore be configured such that the performance and details of mobile devices 12 and network access points are compared against the expected details/performance to search for network issues and compromised systems.

Network Planning: The system 18 can pinpoint areas with large foot traffic or population densities that are also underserved by wireless service providers. These are the areas where network improvements are expected to provide the largest gains to the overall subscriber base. By comparing this performance to that of competitors, the system 18 can suggest areas where the network operator should focus to be more competitive and perform better customer acquisition. The system 18 can therefore be configured such that the results are used in conjunction with user density information collected from the system 18 or external sources to inform a network operator on the most beneficial location for network maintenance, expansions, and upgrades.

Competitor Tracking: The system 18 can be used to inform a network operator on: 1) what new towers or technologies are being implemented by competitors; 2) which network operators are gaining the most subscribers and where; 3) what types of applications/services the competitive network are running and how that is changing over time; and 4) the performance of competitive networks and how that is evolving over time. The system 18 can therefore be configured such that the results are used to inform a wireless operator on the performance being delivered by their competitors to their competitor's subscribers and in which the new network implementation/alternations of competitors are recorded, predicted, and reported.

Connection Management Platform Interaction

Furthermore, the system 18 can also be configured to interact with a device connection management platform (not shown), as my be provided by a mobile phone operating system, or as may be controlled by the network operator, to help a mobile device 12 select an appropriate network 14 or access point connection. In this case the data collected by the WDS 40 is transmitted, either in its raw form or after an analysis of the data, to the connection management platform via an API for use in the network or access point selection process.

Artificial Intelligence and Machine Learning

Furthermore, the system can also benefit from the use of Artificial Intelligence (AI) and Machine Learning (ML) in addition to data analysis. Data reported by the WDS 40 may be input to AI and ML platforms (not shown) for processing into enhanced information to be used by network operators for purposes such as network planning, network maintenance, customer care, customer advertising, and operators. In addition, this enhanced information may be input to SON, software defined network (SDN), network function virtualization (NFV), or MIMO systems such that the network 14 can be responsive to this enhanced information produced by AI and ML processes run on the data supplied by the WDS 40. Groups other than network operators may similarly benefit from the enhanced information produced by AI and ML applied to the WDS test data.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the system 18, any component of or related to the system 18, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of evaluating wireless device and/or wireless network performance and/or wireless network usage trends, the method comprising:
    deploying wireless device software on each of a plurality of wireless electronic devices connected to one or more of a plurality of networks by having the wireless device software embedded in an application or software component running on the corresponding electronic device, wherein the wireless device software is embedded in or operable with a plurality of types of applications and performs at least one test associated with characteristics and/or location of the device, and/or performance of the device and/or the network, and/or usage of the device by a user;
    providing an external testing server, wherein the wireless device software communicates with the external testing server for testing quality of a wireless network and producing test data;
    receiving via one or more collection servers, test data pertaining to the at least one test, obtained by the wireless device software from each of the plurality of wireless electronic devices;
    aggregating the received data;
    storing, analyzing, and outputting the aggregated data; and
    sending configurations, informed by the aggregated test data, to the plurality of wireless electronic devices, to modify the operation of the wireless device software to dynamically obtain particular test data based on the aggregated test data.

2. The method of claim 1, wherein the wireless device software is embedded in at least one application for at least one of the corresponding electronic devices, and/or wherein the wireless device software is embedded in an operating system of at least one corresponding electronic device.

3. The method of claim 2, wherein the at least one application embedding the wireless device software is downloadable from an application store.

4. The method of claim 1, wherein the wireless device software is provided to at least some of the wireless electronic devices by embedding the wireless device software into a third party application or game that is downloaded by the wireless electronic devices independently of an analytics and reporting system that comprises the collection server.

5. The method of claim 4, further comprising tracking a proportion of data acquired by particular third party applications or games for determining revenue sharing.

6. The method of claim 1, further comprising providing a plurality of testing servers to enable the wireless device software to communicate with a particular one of the testing servers.

7. The method of claim 1, further comprising communicating with a configuration server for specifying testing behaviours for the wireless device software, wherein the wireless device software or the testing server communicates with the configuration server to obtain configuration data for performing the at least one test.

8. The method of claim 7, further comprising using the configuration server to control a frequency of testing and/or when and where tests are performed, including an ability to cease further testing by a particular application or device.

9. The method of claim 1, further comprising providing an authentication server for registering the wireless device software and approving use of the wireless device software within the electronic device.

10. The method of claim 1, further comprising providing test data to one or more external entities or systems.

11. The method of claim 10, further comprising processing the test data to generate a user interface for the one or more external entities or systems.

12. The method of claim 11, wherein the one or more external entities or systems register with an online portal for obtaining the processed test data.

13. The method of claim 10, wherein the one or more external entities or systems comprise any one or more of equipment manufacturers, application developers, and wireless network operators for analyzing and modifying systems and practices according to data contained in the test data.

14. The method of claim 13, further comprising enabling future test results to be monitored against previous test results to enable modifications to the systems and practices to be tracked by the one or more external entities or systems over time.

15. The method of claim 10, further comprising analyzing the test data on behalf of a particular third party using an analytics engine.

16. The method of claim 15, further comprising having the wireless device software modulate the testing behaviour in accordance with a request from the particular third party.

17. The method of claim 1, wherein the collected test data is location-based and is stored by the collection server based on its location.

18. The method of claim 17, wherein the location-based data is collected anonymously using a random ID regenerated periodically or is anonymized after collection.

19. The method of claim 1, wherein the wireless device software is configured to wait for the electronic device to connect to a WiFi network prior to sending the test data.

20. The method of claim 1, further comprising obtaining metadata from at least one third party data source, and incorporating the metadata into the stored data.

21. The method of claim 7, wherein the configuration server is configured to enable a kill message to be sent after which the wireless device software stops performing testing, and is no longer responsive to new commands to change testing behaviour.

22. The method of claim 8, wherein the wireless device software has a hardcoded limit of a number of tests that can be performed over a time period, which limits are unalterable by the configuration server.

23. The method of claim 1, wherein the wireless device software is operable to identify its own code running in a different application on a same electronic device.

24. The method of claim 23, wherein the wireless device software is responsive to identifying its own code running in the different application by having only one instance of the wireless device software operating at the same time.

25. The method of claim 1, further comprising:
using the received test data to track a user, whether the user is personally identified or not, as the user moves across networks and/or wireless electronic devices by identifying use of an associated social media login identifier (ID); and
determining an analysis of network or device churn based on such tracking.

26. The method of claim 1, further comprising:
using the received test data to track a user or group of users, whether the user or group of users are personally identified or not, by use of associated mobile advertising identifiers; and
using such data directly or indirectly to target that user or group of users with wireless network operator mobile advertisements.

27. The method of claim 1, further comprising using the received data to compare network test results or service quality to a threshold of quality dictated by a wireless regulator or service level agreement to determine if one or more requirements have been met.

28. The method of claim 10, wherein the test data is transmitted to a Self-Organizing network (SON), software defined network (SDN), network function virtualization (NFV), or multi-input multi-output (MIMO) system, to allow the network to respond to the received test data.

29. The method of claim 10, wherein the test data is transmitted to a connection management system such that mobile devices may be responsive to the data in selecting their network connections.

30. The method of claim 10, further comprising applying artificial intelligence (AI) or machine learning (ML) to the test data to produce enhanced information.

31. The method of claim 1, further comprising using the received data to compare performance and/or details of wireless electronic devices and network access points against expected performance and/or details to identify network issues, compromised systems, or cybersecurity threats.

32. The method of claim 1, further comprising using the received data to determine network characteristics and report on a likely experience provided to users from applications providing data or information to their wireless electronic device.

33. The method of claim 1, further comprising using the received data in conjunction with user density information collected from the collection servers or external sources to inform a network operator on a recommended location for network maintenance and/or network expansion and/or network upgrades.

34. The method of claim 1, further comprising using the received data to inform a first wireless operator on performance delivered by a competitor second network operator to the second network operator's subscribers; and recording, predicting, or reporting new network implementations or alternations applied by the second network operator.

35. A non-transitory computer readable medium comprising computer executable instructions for evaluating wireless device and/or wireless network performance and/or wireless network usage trends, comprising instructions for:
    deploying wireless device software on each of a plurality of wireless electronic devices connected to one or more of a plurality of networks by having the wireless device software embedded in an application or software component running on the corresponding electronic device, wherein the wireless device software is embedded in or operable with a plurality of types of applications and performs at least one test associated with characteristics and/or location of the device, and/or performance of the device and/or the network, and/or usage of the device by a user;
    providing an external testing server, wherein the wireless device software communicates with the external testing server for testing quality of a wireless network and producing test data;
    receiving via one or more collection servers, test data pertaining to the at least one test, obtained by the wireless device software from each of the plurality of wireless electronic devices;
    aggregating the received data;
    storing, analyzing, and outputting the aggregated data; and
    sending configurations, informed by the aggregated test data, to the plurality of wireless electronic devices, to modify the operation of the wireless device software to dynamically obtain particular test data based on the aggregated test data.

36. A system comprising a collection server, the collection server comprising a processor and memory, the memory comprising computer executable instructions for evaluating wireless device and/or wireless network performance and/or wireless network usage trends, comprising instructions for:
    deploying wireless device software on each of a plurality of wireless electronic devices connected to one or more of a plurality of networks by having the wireless device software embedded in an application or software component running on the corresponding electronic device, wherein the wireless device software is embedded in or operable with a plurality of types of applications and performs at least one test associated with characteristics and/or location of the device, and/or performance of the device and/or the network, and/or usage of the device by a user;
    providing an external testing server, wherein the wireless device software communicates with the external testing server for testing quality of a wireless network and producing test data;
    receiving via one or more collection servers, test data pertaining to the at least one test, obtained by the wireless device software from each of the plurality of wireless electronic devices;
    aggregating the received data;
    storing, analyzing, and outputting the aggregated data; and
    sending configurations, informed by the aggregated test data, to the plurality of wireless electronic devices, to modify the operation of the wireless device software to dynamically obtain particular test data based on the aggregated test data.

37. The method of claim 1, further comprising performing data analysis and machine learning operations to the received data to ascertain quality of the received data.

38. The method of claim 1, wherein the wireless device software is configured to run network tests against a plurality of different test servers, each having a different destination to ascertain quality of the test data obtained by that wireless device software.

39. The method of claim 1, wherein the wireless device software is configured to run network tests using a plurality of protocols, each of which appears differently to the network, to ascertain quality of the test data obtained by that wireless device software.

40. The method of claim 37, further comprising filtering the received data.

41. A system comprising a collection server, the collection server comprising a processor and memory, the memory comprising computer executable instructions for evaluating wireless device and/or wireless network performance and/or wireless network usage trends, comprising instructions for:
    providing wireless device software to each of a plurality of wireless electronic devices connected to one or more of a plurality of networks by having the wireless device software embedded in the corresponding electronic device, wherein the wireless device software is embedded in or operable with a plurality of types of applications and performs at least one test associated with characteristics and/or location of the device, and/or performance of the device and/or the network, and/or usage of the device by a user, and wherein the wireless device software is operable to identify its own code running in a different application on a same electronic device;
    receiving via one or more collection servers, test data obtained by the wireless device software of each of the plurality of wireless electronic devices;
    aggregating the received data;
    storing, analyzing, and outputting the aggregated data; and
    sending configurations, informed by the aggregated test data, to the plurality of wireless electronic devices, to modify the operation of the wireless device software to dynamically obtain particular test data based on the aggregated test data.

42. The system of claim 41, wherein the wireless device software is responsive to identifying its own code running in the different application by having only one instance of the wireless device software operating at the same time.

* * * * *